(12) United States Patent
Baccetti

(10) Patent No.: US 9,289,091 B2
(45) Date of Patent: *Mar. 22, 2016

(54) DISPOSABLE BEVERAGE PRESS

(71) Applicant: SmartCup, Inc., Auburn, CA (US)

(72) Inventor: Jeff Baccetti, Redmond, WA (US)

(73) Assignee: Smartcup, Inc., Auburn, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 13/741,919

(22) Filed: Jan. 15, 2013

(65) Prior Publication Data

US 2013/0125761 A1    May 23, 2013

Related U.S. Application Data

(63) Continuation of application No. 12/437,093, filed on May 7, 2009, now Pat. No. 8,375,846.

(60) Provisional application No. 61/126,773, filed on May 7, 2008.

(51) Int. Cl.
    *A47J 31/20*    (2006.01)

(52) U.S. Cl.
    CPC .................................... *A47J 31/20* (2013.01)

(58) Field of Classification Search
    USPC ............... 99/297, 302 P, 287; 100/37, 295
    See application file for complete search history.

(56) References Cited

U.S. PATENT DOCUMENTS

| | | | |
|---|---|---|---|
| 1,116,932 A | | 11/1914 | Schwartz |
| 2,086,463 A | * | 7/1937 | Bram .............................. 108/65 |
| 2,562,433 A | * | 7/1951 | Moore ............................ 99/319 |
| 2,900,896 A | * | 8/1959 | Bondanini ...................... 99/287 |
| 3,098,425 A | * | 7/1963 | Falla ............................... 99/317 |
| 3,113,533 A | * | 12/1963 | Snow ........................... 108/134 |
| 3,158,084 A | * | 11/1964 | Cohn .............................. 99/297 |
| 3,279,351 A | * | 10/1966 | Cohn .............................. 99/282 |
| 3,307,474 A | * | 3/1967 | Kasher ........................... 99/287 |
| 3,413,908 A | * | 12/1968 | Nadelson ....................... 99/297 |

(Continued)

FOREIGN PATENT DOCUMENTS

| WO | WO-2008/147308 A1 | 12/2008 | |
|---|---|---|---|
| WO | WO 2008147308 A1 | * 12/2008 | ........... B65D 85/812 |

(Continued)

OTHER PUBLICATIONS

International Search Report and Written Opinion for International Application No. PCT/US2009/43133 dated Feb. 1, 2010 (17 pages).

(Continued)

*Primary Examiner* — Henry Yuen
*Assistant Examiner* — Jimmy Chou
(74) *Attorney, Agent, or Firm* — Goodwin Procter LLP

(57) ABSTRACT

Apparatuses, systems and methods for providing a pressed beverage using a press and lid system. In one aspect, a beverage material is pressed to the bottom of a beverage container by means of a press ring including a filter. The walls of the beverage container exert a force on the press ring, folding flaps (perimeter portions) that are attached to the press ring by means of a flexible attachment member. Any beverage material or other debris that is not collected by the filter in the press ring is collected by a filter in the lid. Other variations and features consistent with the present invention exist.

10 Claims, 27 Drawing Sheets

(56) References Cited

U.S. PATENT DOCUMENTS

| | | | | |
|---|---|---|---|---|
| 3,927,608 A * | 12/1975 | Doyel | | 99/297 |
| 3,935,318 A * | 1/1976 | Mihailide | | 426/80 |
| 4,365,544 A * | 12/1982 | Howitt | | 99/297 |
| 4,703,857 A | 11/1987 | Jahnen et al. | | |
| 4,737,036 A * | 4/1988 | Offermann | | 366/130 |
| 4,856,843 A * | 8/1989 | Elliott | | 296/186.4 |
| 4,927,107 A * | 5/1990 | Mateo Maria | | 248/240.4 |
| 4,962,615 A * | 10/1990 | Birdling | | 49/381 |
| 4,998,484 A * | 3/1991 | Groetzinger | | 108/42 |
| 5,478,586 A * | 12/1995 | Connor | | 426/431 |
| 5,544,592 A * | 8/1996 | Leezer | | 108/48 |
| 5,570,623 A * | 11/1996 | Lin | | 99/285 |
| 5,588,697 A * | 12/1996 | Yoshida et al. | | 297/173 |
| 5,618,570 A * | 4/1997 | Banks et al. | | 426/435 |
| 5,713,404 A * | 2/1998 | Ladewig | | 144/285 |
| 5,770,074 A * | 6/1998 | Pugh | | 210/474 |
| 5,887,510 A * | 3/1999 | Porter | | 99/287 |
| 5,952,028 A * | 9/1999 | Lesser | | 426/433 |
| 5,979,299 A * | 11/1999 | Hornsby et al. | | 99/297 |
| 6,038,963 A | 3/2000 | Patterson et al. | | |
| 6,039,416 A * | 3/2000 | Lambert | | 312/245 |
| 6,079,316 A * | 6/2000 | Barden et al. | | 99/297 |
| 6,161,486 A * | 12/2000 | Boots | | 108/48 |
| 6,240,833 B1 | 6/2001 | Sham et al. | | |
| 6,324,966 B1 * | 12/2001 | Joergensen | | 99/297 |
| 6,334,400 B1 * | 1/2002 | Nien | | 108/115 |
| 6,343,834 B1 * | 2/2002 | Wurmlinger | | 297/14 |
| 6,374,726 B1 * | 4/2002 | Melton | | 99/323 |
| 6,705,235 B1 * | 3/2004 | Gerutto | | 108/47 |
| 6,725,763 B2 * | 4/2004 | Cai | | 99/287 |
| 6,797,160 B2 * | 9/2004 | Huang | | 210/117 |
| 7,093,531 B2 * | 8/2006 | Tardif | | 99/297 |
| 7,194,751 B2 * | 3/2007 | Fujii et al. | | 720/718 |
| 7,194,951 B1 * | 3/2007 | Porter | | 100/116 |
| 7,337,705 B1 * | 3/2008 | Catena et al. | | 99/297 |
| 7,389,720 B2 * | 6/2008 | Haverstock | | 99/297 |
| 7,461,587 B2 * | 12/2008 | Guerrero | | 99/323 |
| 7,475,644 B2 * | 1/2009 | Strong et al. | | 108/132 |
| 7,578,231 B2 * | 8/2009 | Liu | | 99/297 |
| 7,634,969 B2 * | 12/2009 | Neunzert et al. | | 108/132 |
| 7,745,759 B2 * | 6/2010 | Long et al. | | 219/214 |
| 8,051,766 B1 * | 11/2011 | Yu et al. | | 99/297 |
| 8,156,875 B2 * | 4/2012 | Neunzert et al. | | 108/132 |
| 8,267,017 B1 * | 9/2012 | Michael et al. | | 108/42 |
| 8,313,644 B2 * | 11/2012 | Harris et al. | | 210/198.1 |
| 8,375,846 B2 * | 2/2013 | Baccetti | | 99/297 |
| 8,402,888 B2 * | 3/2013 | Baccetti | | 100/116 |
| 2004/0094076 A1 * | 5/2004 | Jin | | 108/132 |
| 2005/0005826 A1 * | 1/2005 | Strong et al. | | 108/132 |
| 2005/0120803 A1 * | 6/2005 | Sokol et al. | | 73/801 |
| 2005/0139091 A1 * | 6/2005 | Haverstock | | 99/495 |
| 2005/0241551 A1 * | 11/2005 | Neunzert et al. | | 108/132 |
| 2006/0021524 A1 * | 2/2006 | Liu | | 100/116 |
| 2007/0028779 A1 * | 2/2007 | Pigliacampo et al. | | 99/297 |
| 2007/0235433 A1 * | 10/2007 | Osicki | | 219/125.1 |
| 2007/0240580 A1 * | 10/2007 | Lusareta et al. | | 99/279 |
| 2008/0245237 A1 * | 10/2008 | Haverstock | | 99/297 |
| 2009/0044460 A1 * | 2/2009 | Medley | | 52/71 |
| 2009/0277335 A1 | 11/2009 | Baccetti | | |
| 2010/0005979 A1 | 1/2010 | Baccetti | | |
| 2011/0239549 A1 * | 10/2011 | Medley | | 52/79.5 |

FOREIGN PATENT DOCUMENTS

| | | |
|---|---|---|
| WO | WO/2009/137668 | 11/2009 |
| WO | WO/2011/034550 | 3/2011 |

OTHER PUBLICATIONS

International Search Report and Written Opinion for International Application No. PCT/US09/57770, dated Jul. 8, 2010 (15 pages).
International Search Report and Written Opinion for International Application No. PCT/US09/57770, dated Apr. 5, 2012 (6 pages).
Communication Pursuant to Article 94(3) EPC from European Application No. 09 792 815.4-1656 dated Jul. 15, 2013 (4 pages).

* cited by examiner

DISPOSABLE BEVERAGE PRESS

CROSS-REFERENCE TO RELATED APPLICATION

This patent application is a continuation of U.S. patent application Ser. No. 12/437,093 filed on May 7, 2009, entitled "Disposable Beverage Press", which claims priority under 35 U.S.C. 119(e) to provisional utility application 61/126,773, filed May 7, 2008, both of which are hereby incorporated by reference.

FIELD OF THE INVENTION

The present invention relates, generally, to a French coffee press, and more specifically, to a method, system and apparatus for preparing a cup of coffee, tea or other infused beverage in the same manner as a French coffee press using a disposable lid system and a standard disposable cup.

BACKGROUND OF THE INVENTION

Beverage presses are found in several forms. For example, a traditional French press is a device for preparing French press coffee. A French press usually consists of at least a cylindrical jug (usually glass or plastic), a lid, and a press ring disposed beneath the lid and connected to a rod that extends through and above the lid. The press ring may be made of metal or plastic, and includes a filter, often made of fine wire. The press ring is often circular, with a diameter slightly smaller than the diameter of the cylindrical jug, so that the periphery of the press ring contacts the inner wall of the jug, forming a seal. The filter is disposed in the press ring such that the hot liquid and also oils from rough coffee grounds may pass through, but grounds and other debris are stopped.

The operation of a traditional French press is as follows. First, rough ground coffee is placed at the bottom of the jug. Next, a hot liquid is poured into the jug, over the rough ground coffee. The oils from the grounds permeate and infuse the liquid and then, the grounds are "pressed" to the bottom of the jug by the press ring, by means of the rod. The grounds are held at the bottom of the jug by the press ring.

Presently, in order to offer French press coffee, many coffee retailers prepare the coffee using a traditional French press, and then pour the French press coffee into a disposable "to-go" coffee cup, or into a "for here" mug. The disposable cups sold by retailers are usually tapered, often made of paper or Styrofoam®. This manner of preparing French press coffee poses a problem because it typically takes three or four minutes to prepare each cup. Additionally, the French press must be cleaned after each use. This is not efficient or practical for a coffee retailer that depends on a high volume of coffee sales in order to be profitable.

Thus, there is a need for a quick and cost-effective method for serving French press coffee.

One potential solution is to replace the jug of a traditional French press with a disposable "to-go" coffee cup. U.S. Published Patent Application 20050139091 ("Haverstock"), is an example of such systems. In Haverstock, a separate rod and press are used with a disposable cup and dome lid. A hole is pre-fabricated into the dome lid for the rod. The customer must install the press ring in the cup, and then press the rough grounds.

There are multiple problems with Haverstock and similar designs that render it unsatisfactory. First, the hot liquid softens paper cups such that the force of the press ring on the inner wall of the cup flexes walls. The flexing creates space between the press ring and the inner wall of the cup, through which grounds and other debris may pass making the coffee undrinkable. The farther the press ring moves along the tapered length of the disposable cup, the more severe the flexing. This flaw exists whether the disposable cup is made of paper, Styrofoam, or even plastic. Furthermore, the hole in the lid as described by Haverstock allows hot liquid to pour out onto the customer as the cup is tipped.

Thus, there exists a need for a disposable French press that can operate with a typical disposable "to-go" coffee cup.

BRIEF SUMMARY OF THE INVENTION

In accordance with exemplary embodiments of the present invention, there is provided a press ring used in a beverage press, the press ring including a support member; a filter disposed over the support member; a perimeter portion that is connected to the support member by a flexible attachment element.

In accordance with another exemplary embodiment of the present invention, there is provided a dome lid for a beverage container, the dome lid including body having a substantially circular planer top surface; a filter slot on the body; a guide hole though the substantially circular planar top surface; and a sealing portion around the guide hole.

In accordance with exemplary embodiment of the present invention, there is provided a lid system for a beverage container, the system including a dome lid for a beverage container; and a filter insertable into a filter slot in the dome lid.

In accordance with exemplary embodiment of the present invention, there is provided a lid and press system for a beverage container, the lid and press system including a press ring having a first filter; and a dome lid having a second filter.

In accordance with exemplary embodiment of the present invention, there is provided a lid and press system for a beverage container, the system comprising a press ring having a first filter and a guide portion; a dome lid having a second filter and a guide hole; and a beverage container. According to this exemplary embodiment, the press ring is connected to the dome lid by the guide portion fitted into the guide hole, and the dome lid is fitted above the beverage container.

In accordance with exemplary embodiment of the present invention, there is provided a method of separating material from a liquid, the method including the steps of: pressing material in a liquid to the bottom of a container with a press ring so that the liquid passes through a first filter as the material is pressed; pouring the liquid out of the container such that liquid passes through a second filter as it exits the container.

In accordance with exemplary embodiment of the present invention, there is provided a press ring, comprising: a support member; a first perimeter portion that is connected to the support member by a first flexible attachment element; a second perimeter portion that is connected to the support member by a second flexible attachment element; a filter disposed between the first perimeter portion and the second perimeter portion.

DETAILED DESCRIPTIONS OF EXEMPLARY EMBODIMENTS

There are many non-disposable beverage press systems available today such as the 'French Press'. These systems are typically made of glass, metal and plastic and are priced in the medium to expensive range and are to be used for years. These pressing systems are too bulky and not convenient for taking in the car, transporting, or to dispense a pressed beverage in a retail setting. What is missing in the commercial, retail and consumer markets is a truly disposable beverage press that is as convenient to use as a standard disposable beverage cup and is inexpensive.

The beverage press according to exemplary embodiments of the present invention, is comprised of multiple components, each of which solves different deficiencies and flaws within the prior art presses. Exemplary embodiments of the components will be described individually, and as part of exemplary disposable beverage presses.

The "top" and "bottom" of a cup will be referred to throughout the written description for ease of reference. The top of the cup refers to the open end with the wider circumference, and the bottom of the cup refers to the closed end with the smaller circumference. This convention is adopted merely for convenience, and should not in any way be read to limit the breadth of the present invention.

Figure 1:
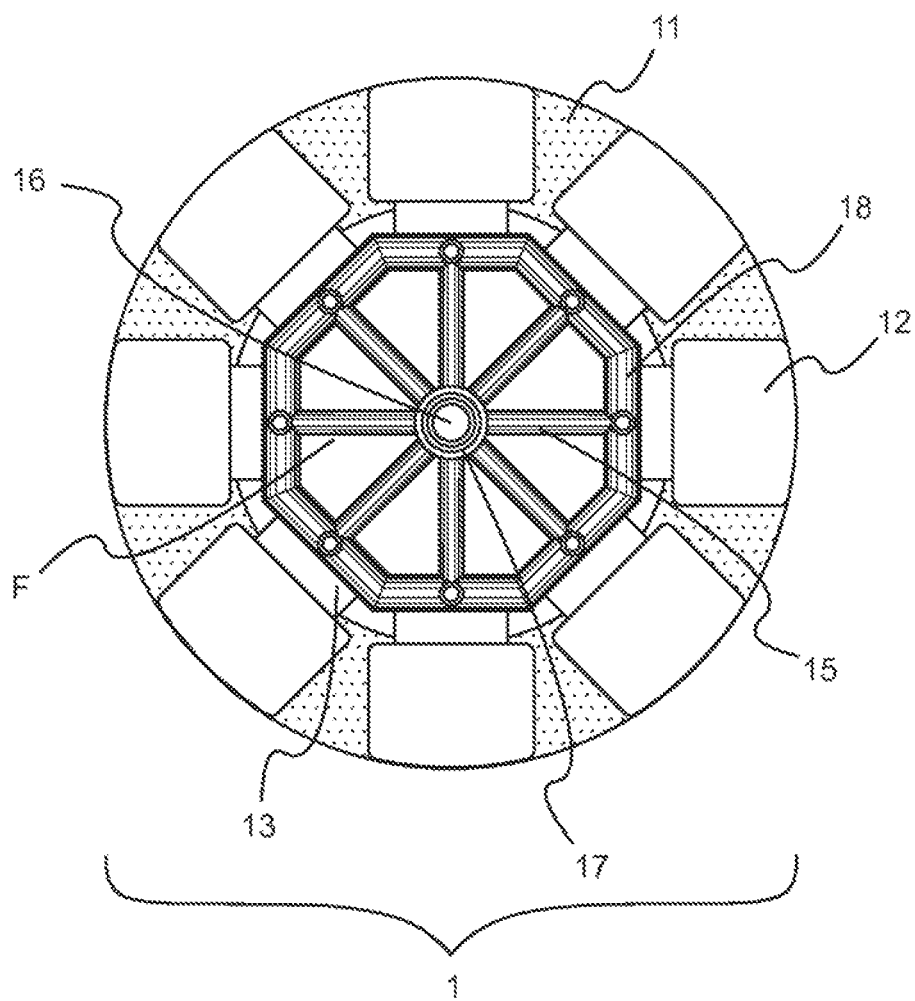
FIG. 1 is a top-down view of a press ring according to an exemplary embodiment of the present invention.

FIG. 1 illustrates a Press Ring 1 according to an exemplary embodiment of the present invention. The Press Ring 1 includes a Filter 11, Flaps 12, Flap Attachment Elements 13, a Frame 14, Frame Members 18, Struts 15, a Push Rod Guide and Stop 16, and a Lid Alignment Flange 17.

The Frame Members 18 of Frame 14 intersect to form an enclosed area F as shown in FIG. 1. Each Strut 15, extends inwardly from the perimeter of the area F defined by the Frame 14, and attaches to the Push Rod Guide and Stop 16. The Push Rod Guide and Stop 16 is disposed at the center point of the area F. The Push Rode Guide and Stop 16 is substantially cylindrical in shape and volume. The Push Rod Guide and Stop 16 is bored at one end, creating a bore along the axis of the Push Rode Guide and Stop 16, but not completely through, leaving one end closed. As will be described later, a push rod bottom may be inserted into the bore. The axis of the Push Rod Guide and Stop 16 extends generally perpendicular to the plane of the area F. The Push Rod Guide and Stop 16 may extend through (i.e., break) the plane of the area F, or one end of the Push Rod Guide and Stop 16 (e.g., the closed end) may abut the area F.

The Flaps 12 are attached to the Frame 14 by the Flap Attachment Elements 13. Each Flap 12 is attached to the Frame 14 such that the plane of the Flap 12 is on substantially the same plane as the enclosed area F. According to the exemplary embodiment illustrated in FIG. 1, there are eight Frame Members 18, and eight Flaps 12. One of ordinary skill in the art would recognize that the number of Frame Members 18 and Flaps 12 may be fewer or greater based on specific circumstances.

According to the exemplary embodiment illustrated in FIG. 1, there are four Struts 15, but one of ordinary skill in the art would recognize that number of Struts 15 could be greater or fewer depending on, for example, the longitudinal compression on the Frame 14 and the Frame Members 18.

The Filter 11, according to this exemplary embodiment, may be substantially disc shaped, and disposed across the bottom of the Frame 14 and Flaps 12, such that substantially all of the surface area of the area F, extending to the perimeter of the Flaps 12, is covered by the Filter 11. In this exemplary embodiment, the radius from the center of the Filter 11 to the perimeter of the Filter 11 is at least equal to the radius from the center of the Guide Hole 16 to the perimeter formed by the outer most edge of the Flaps 12, although the radius to the perimeter of the Filter 11 may be longer.

Figure 2A:
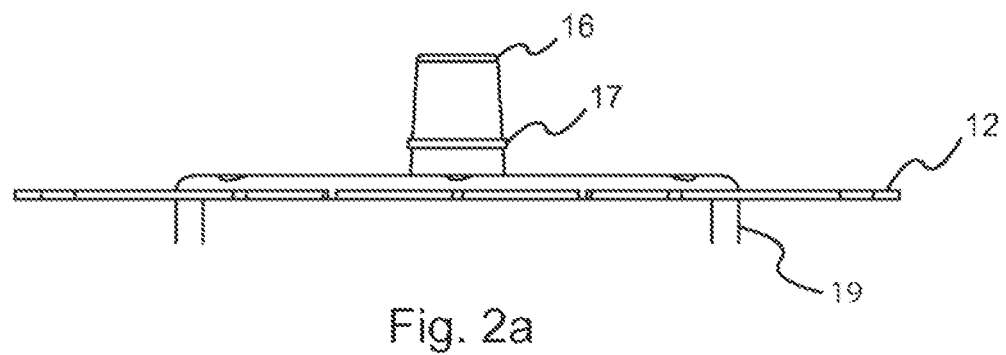
FIG. 2a is a side view of a press ring according to an exemplary embodiment of the present invention.
Figure 2B:
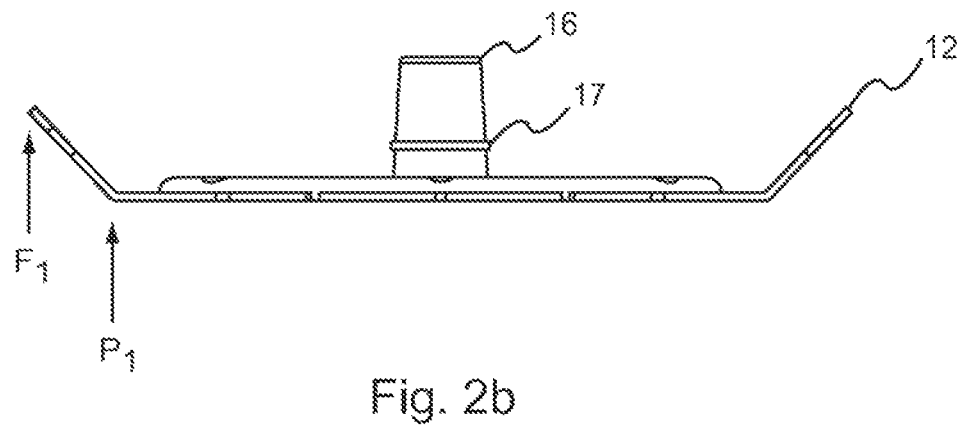
FIG. 2b is a side view of a press ring according to an exemplary embodiment of the present invention.

FIGS. 2a and 2b each are a side view of the Press Ring 1 illustrated in FIG. 1.

As illustrated by FIG. 2a, the Adhesion Spikes 19 are disposed beneath the Filter 11, and the Frame 14.

FIG. 2b illustrates the effect of a force $F_1$ applied to the Flaps 12. When a sufficient Force $F_1$ is applied to the Flaps 12, the Flaps 12 pivot around a Pivot Point $P_1$. The location of Pivot Point $P_1$ depends on the material and dimensions of the Flap Attachment Element 13 (FIG. 1), but typically Pivot Point $P_1$ is located near the contact point of a Flap Attachment Element 13 and the Frame 14.

According to one exemplary embodiment, the Flaps 12, pivot around the Flap Attachment Elements 13, which operate like a mechanical hinge. The Attachment Elements 13 may rotate around a pin, or it may be made of a material that is sufficiently flexible, such as plastic, paper, etc.

In this exemplary embodiment is essentially a mechanical hinge. One of ordinary skill in the art would know that the present invention is not limited to the exemplary embodiment of the Press Ring 1 described herein. One of ordinary skill in the art would recognize that the specific embodiment of the Press Ring may be changed without diverging from the spirit of the invention. For example, the Press Ring could crumple or compress as a force is applied to the perimeter. Instead of Flaps, The Press Ring could have a single continuous flap that pivots upward, crumples or compresses. Alternatively, the Press Ring could include multiple layers, where a layer fails as a force is applied to the perimeter. One of ordinary skill in the art would recognize that other modifications exist.

Figure 3:
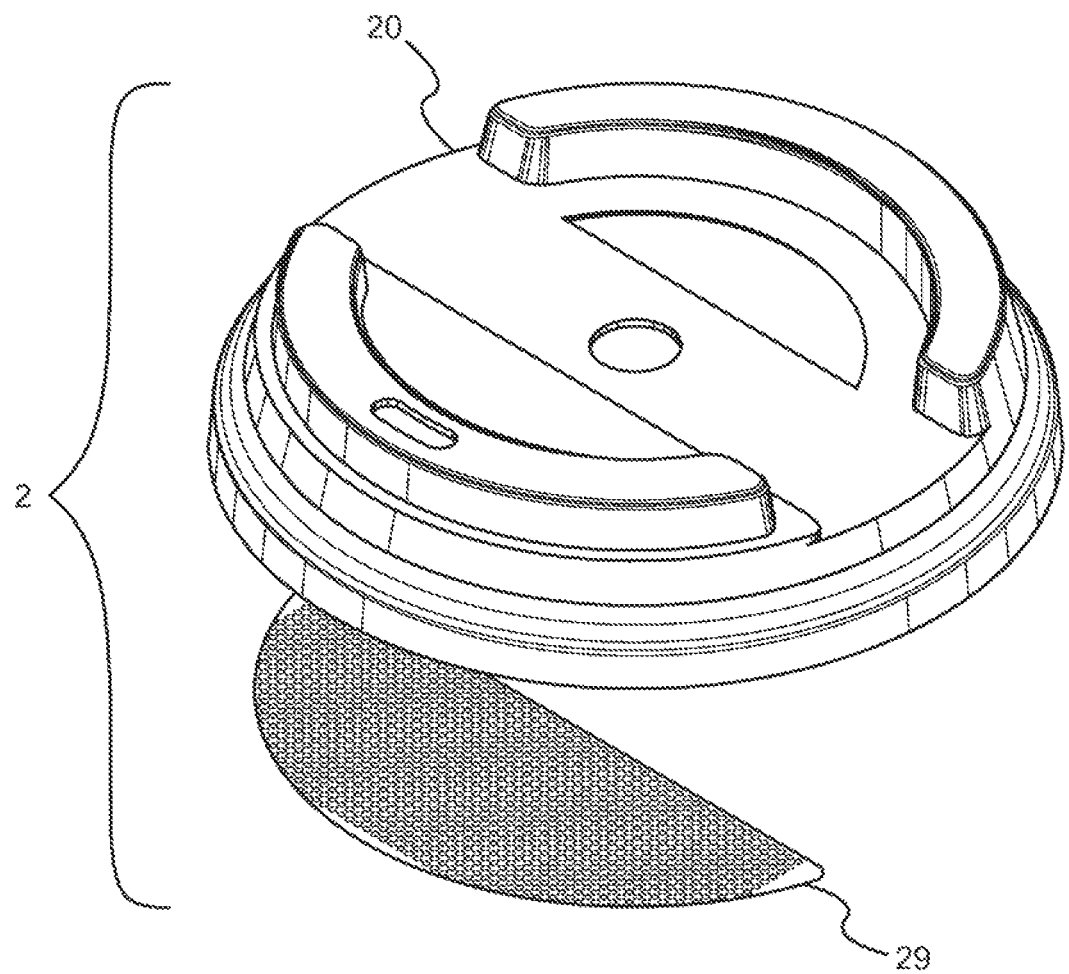
FIG. 3 is an exploded view of a Lid system according to an exemplary embodiment of the present invention.

FIG. 3 is an exploded view of the Lid System 2 according to an exemplary embodiment of the present invention. The Lid System 2 includes a Lid 20 and a Lid Filter 29.

Figure 4:
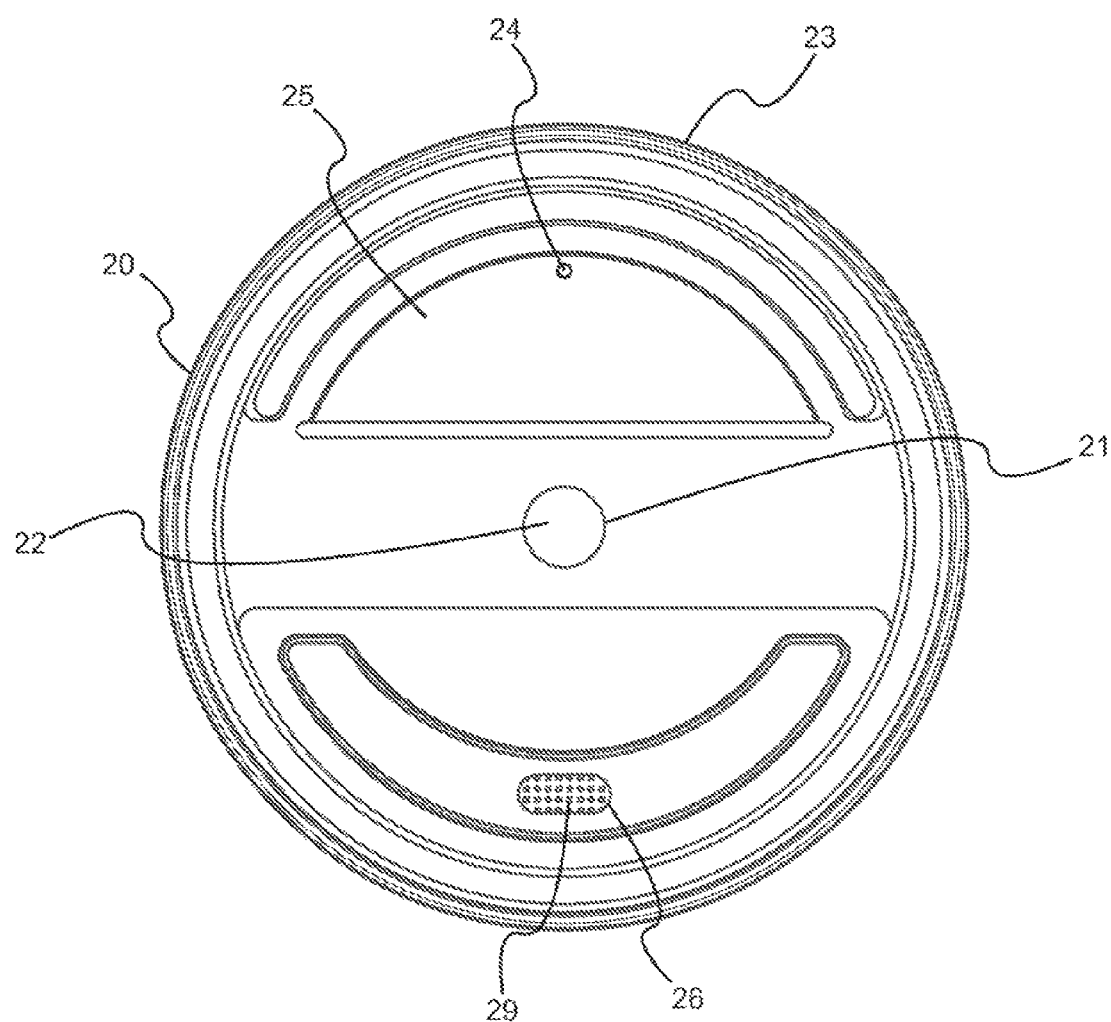
FIG. 4 is a top-down view of a Lid system according to an exemplary embodiment of the present invention.

FIG. 4 illustrates a top-down view of a Lid 20 according to an exemplary embodiment of the present invention. The Lid 20 includes a Pressure Ring 23, a Seal 21, and a Press Ring Guide Hole 22. The Lid 20 may also include a Vent 24, a Condiment Hole 25, and a Pour Spout 26.

The Pressure Ring 23 is a recessed portion disposed around the outer perimeter of the Lid 20. The recessed portion of the Pressure Ring 23 engages the lip/rim of a typical beverage container. Once the Pressure Ring 23 engages the lip/rim of a beverage container, it forms a liquid tight seal.

The Seal 21 is a flexible material disposed around the Press Ring Guide Hole 22. The Seal 21 compresses (i.e., flexes in a direction toward the bottom of the Lid 20) when a force is applied on the Seal 21. In another exemplary embodiment, the Seal 21 may include slits that allow an object larger than the circumference of the Press Ring Guide Hole 22 to pass through.

According to another exemplary embodiment the Seal 21 is not present. Instead, the press rod may create a liquid tight seal over the Guide Hole 22. The liquid tight seal is created, in part, by a Top Flange 42 and a Bottom Flange 44 of a Push Rod 4 (FIG. 10), which have a larger diameter than the Guide Hole 22, and thus can cover the Guide Hole 22.

Figure 5:
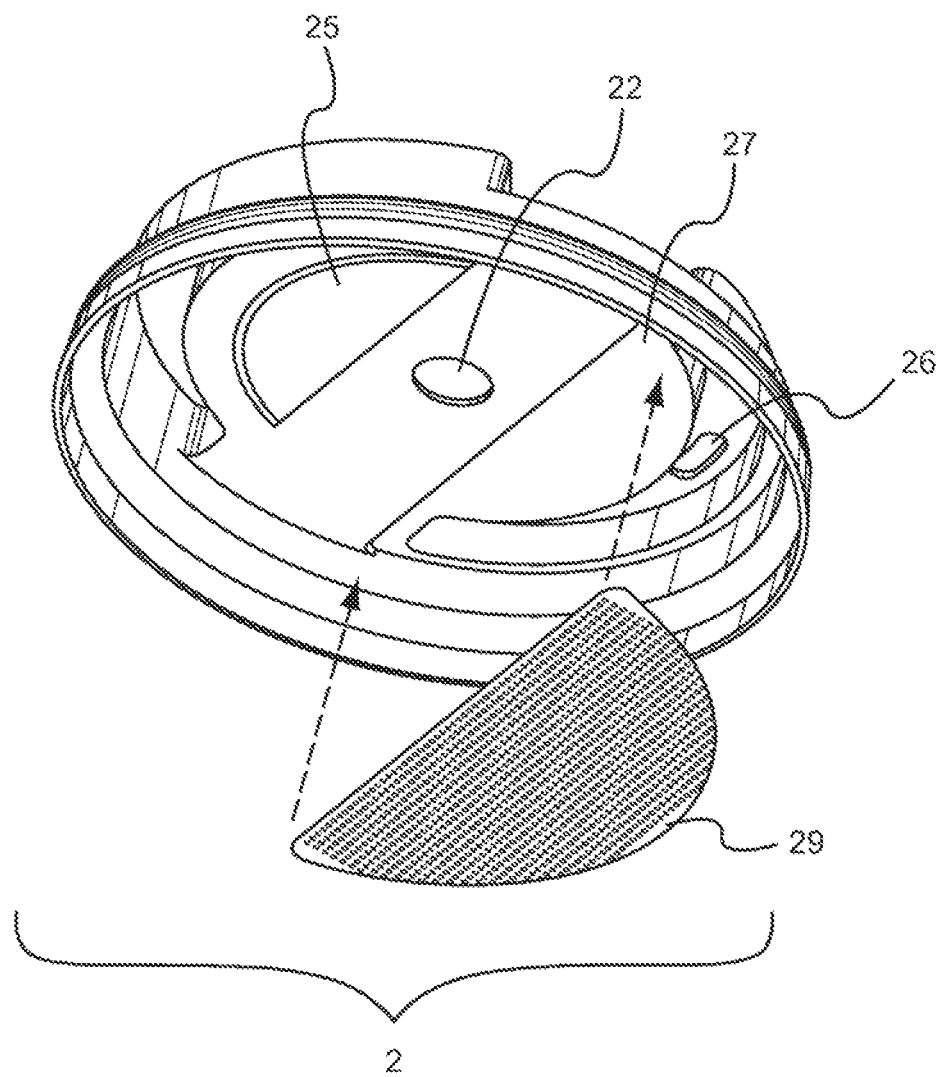
FIG. 5 is a bottom-up view of a lid system according to an exemplary embodiment of the present invention.

FIG. 5 illustrates a bottom-up view of the Lid System 2 according to an exemplary embodiment of the present invention. From this perspective it is possible to view the Lid 20, a Filter Slot 27, Lid Filter 29, Condiment Hole 25, Pour Spout 26, and the Press Ring Guide Hole 22.

Figure 6:
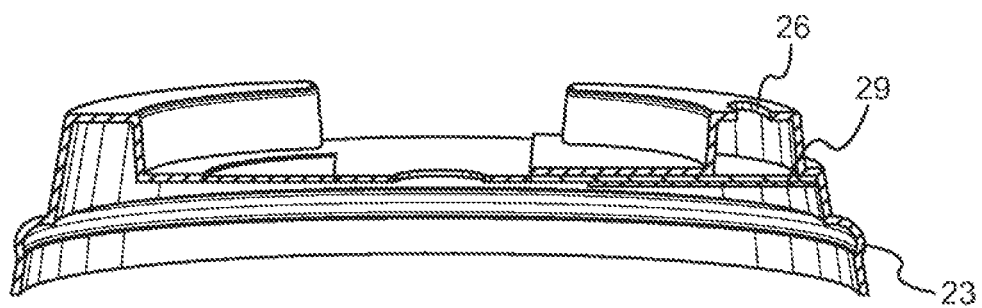
FIG. 6 is a lid retainer according to an exemplary embodiment of the present invention.

FIG. 6 is a cut-out view of the Lid System 2 according to an exemplary embodiment of the present invention. Here, the Lid Filter 29 is disposed beneath the Pour Spout 26. The Lid Filter 29 resides in the Filter Slot 27 (not shown), and is attached to the Lid 20 such that it completely covers the bottom opening of the Pour Spout 26. There are multiple ways that that Lid Filter 29 could be attached to the Lid 20. For example, the Lid Filter 29 could be glued, welded, sewed, etc. According to this exemplary embodiment, the filter slot is slightly depressed so that the underside of the middle portion of the Lid 20 having that Guide Hole 22 is not on the same plane.

Figure 7:
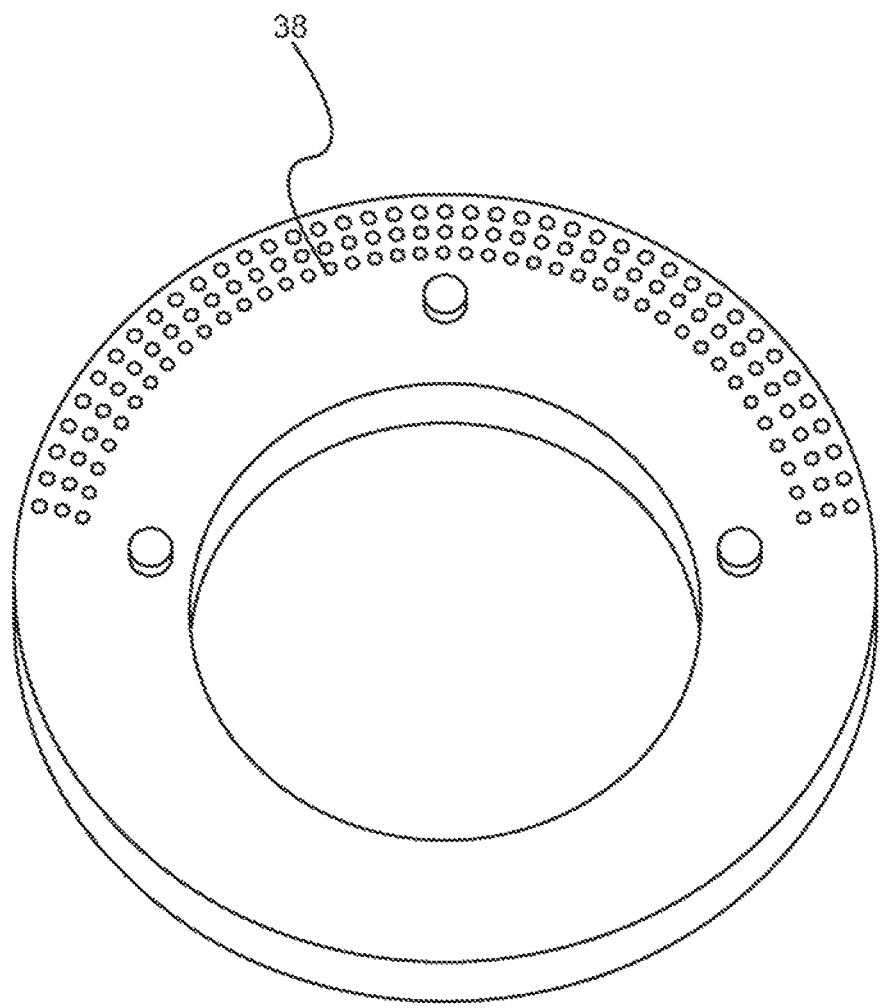
FIG. 7 is a Lid system according to an exemplary embodiment of the present invention.
Figure 8:
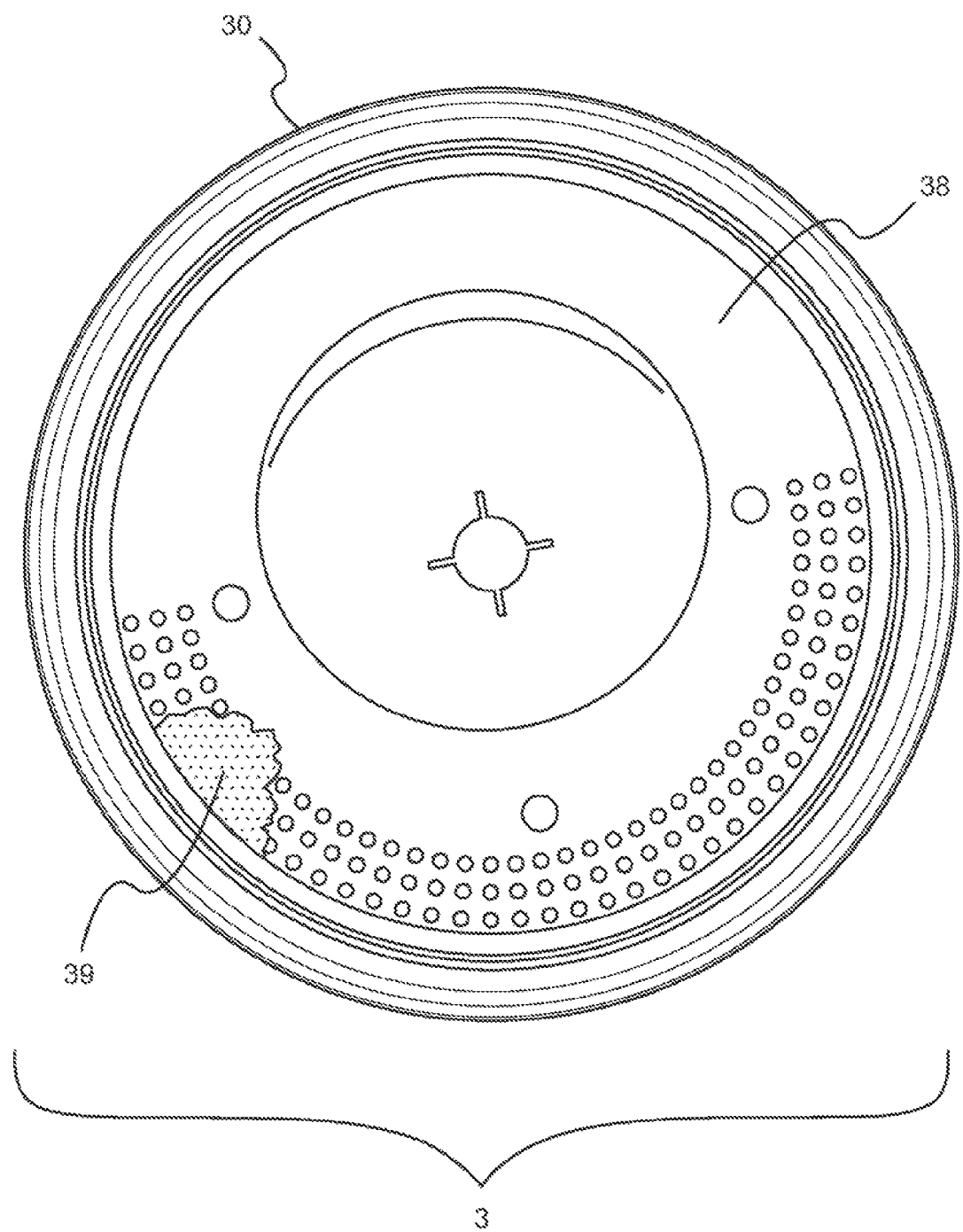
FIG. 8 is a Lid system according to an exemplary embodiment of the present invention.
Figure 9:
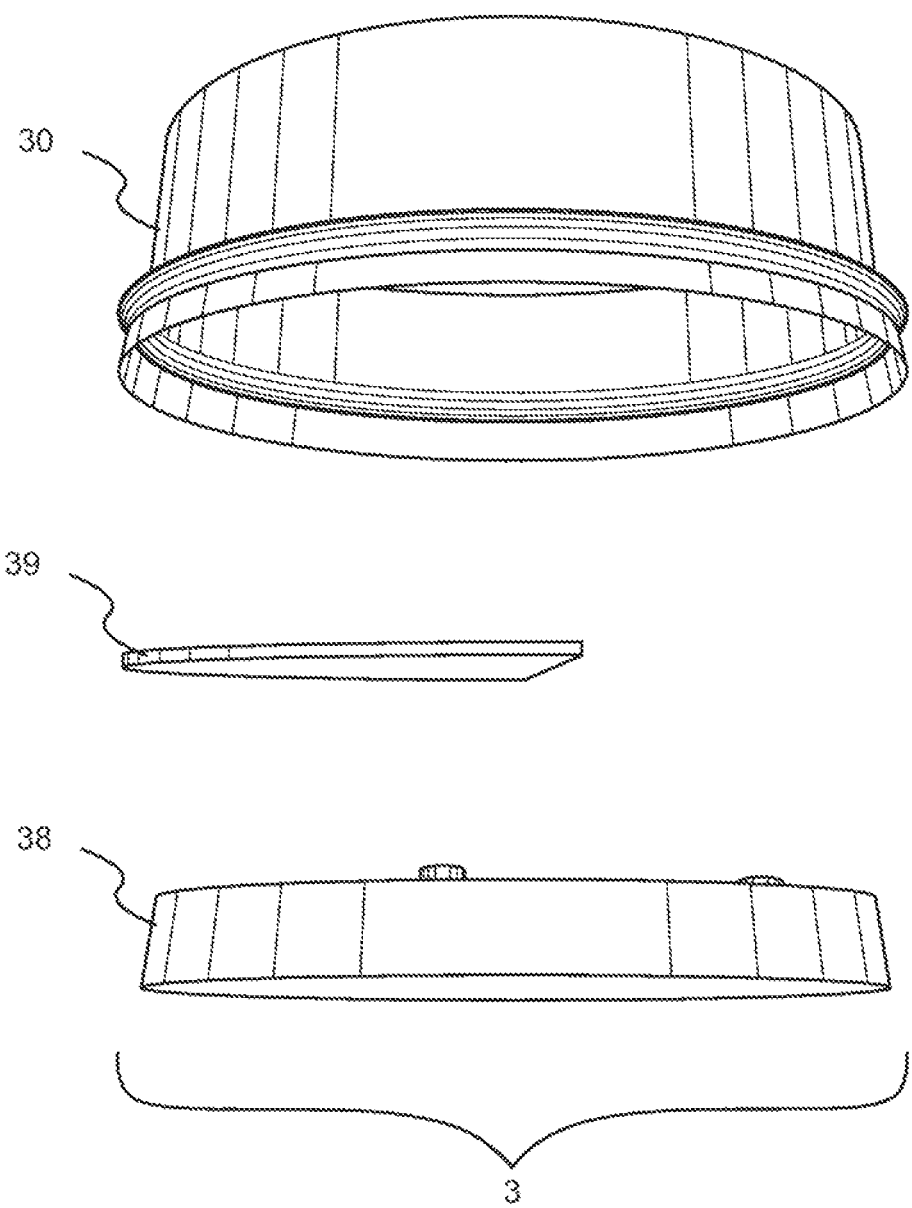
FIG. 9 is a Press Rod according to an exemplary embodiment of the present invention.

FIGS. 7-9 illustrate a Lid System 3 according to another exemplary embodiment of the present invention. In this exemplary embodiment, a Lid Filter 39 is held in place by a Filter Retainer 38.

FIG. 7 is a bottom up view the Filter Retainer 38 according to an exemplary embodiment of the present invention. The Filter Retainer 38 is a substantially circular shape. The body of the Filter Retainer 38 extends in from a perimeter to a removed portion to form an "O" ring. Holes may be disposed across a portion of the body of the Filter retainer 38, as illustrated in FIG. 7. The perimeter of the Filter Retainer 38 extends upwardly, transverse to the plane of the body of the Filter Retainer 38, around the entire circumference of the Filter retainer 38.

FIG. 8 is a bottom-up view of the Lid System 3 including the filter Retainer 38, according to an exemplary embodiment of the present invention. When the Filter Retainer 38 is fastened to the Lid 30, the removed portion is dispose beneath the Condiment Hole 35. As explained above, the Filter Retainer 38 may also include a second portion with holes that is disposed beneath the Lid Filter 39. The second portion with holes could also be a removed portion, as long as the Lid Filter 39 is held in place, and liquid can pass the Filter Retainer 38 to (and through) the Lid Filter 39.

FIG. 9 is an exploded view of the lid System 3 including the Filter Retainer 38, according to an exemplary embodiment of the present invention. The Lid Filter 39 inserts into the lid, and the Filter Retainer 33 inserts into the Lid 30, and abuts the Lid Filter 39, holding it into place.

Figure 10:
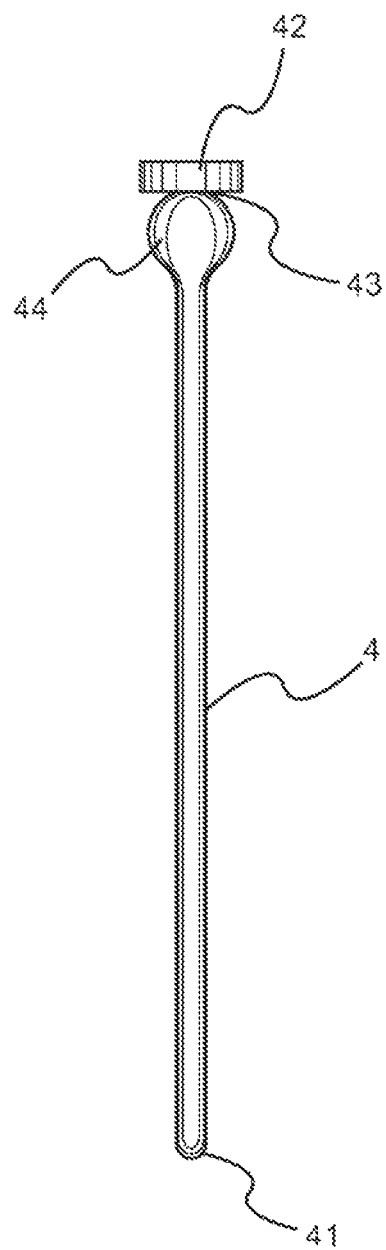
FIG. 10 is a Lid and Cup system according to an exemplary embodiment of the present invention.

FIG. 10 illustrates a Press Rod 4 according to an exemplary embodiment of the present invention. The Press Rod 4 includes a Rod Bottom 41, a Top Flange 42, a Lock Flange 43, and a Bottom Flange 44.

Figure 11:
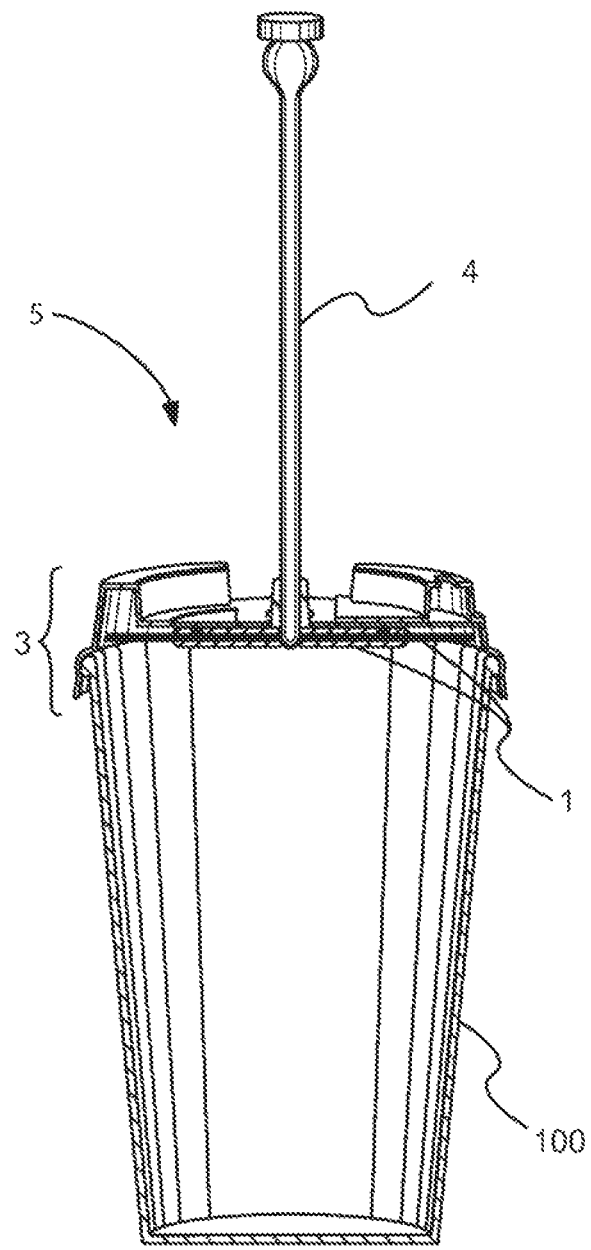
FIG. 11 is an exploded view of a Lid and Press system according to an exemplary embodiment of the present invention.

FIG. 11 is a cut-out view of a Lid, Cup and Rod System 5 according to an exemplary embodiment of the present invention. The Lid, Cup and Rod System 5 includes the Rod 4, the Lid System 3, the Press Ring 1 and the Cup 100. The recessed portion of the Pressure Ring 33 of the Lid 30 engages the rim/lip of the Cup 100, creating a liquid-tight seal. The Rod Bottom 41 (FIG. 10) inserts into the Push Rode Guide and Stop 16, which is positioned in the Push Rode Guide Hole 32 (FIG. 14).

Figure 12:
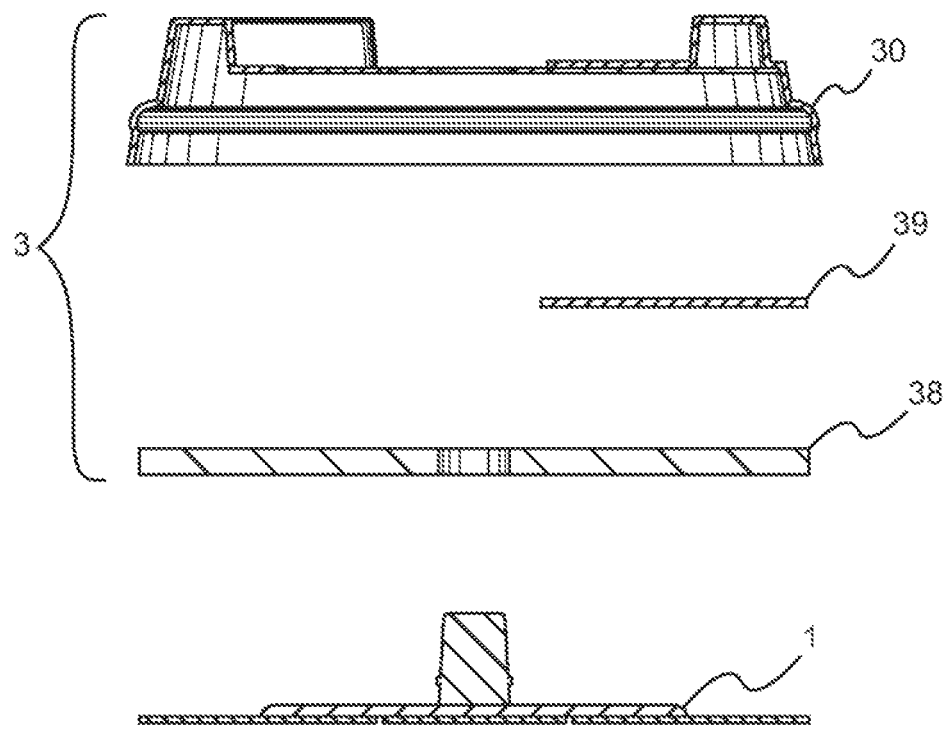
FIG. 12 is a cut-out view of a Lid and Press system according to an exemplary embodiment of the present invention.

FIG. 12 is an exploded view of a Lid and Press System 6 according to an exemplary embodiment of the present invention. The Lid and Press System 6 includes the Lid 30, the Lid Filter 39, the Filter Retainer 38 (i.e., the Lid System 3, FIG. 9), and the Press Ring 1.

Figure 13:
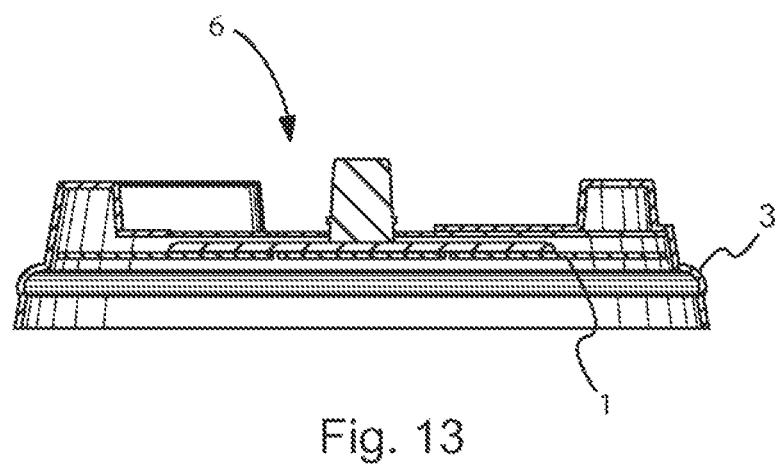
FIG. 13 is an isometric view of a Lid and Press system according to an exemplary embodiment of the present invention.

FIG. 13 is a cut-out view of the Lid and Press System 6 according to an exemplary embodiment of the present invention. The Push Rod Guide and Stop 16 and Lid Alignment Flange 17 inserts into the Press Ring Guide Hole 32 (FIG. 14). The Push Rod Guide and Stop 16, Lid Alignment Flange 17 and Press Ring Guide Hole 32, couple/snap together using force created from Alignment Flange 17 against the Press Ring Guide Hole 32 (FIG. 14).

Figure 14:
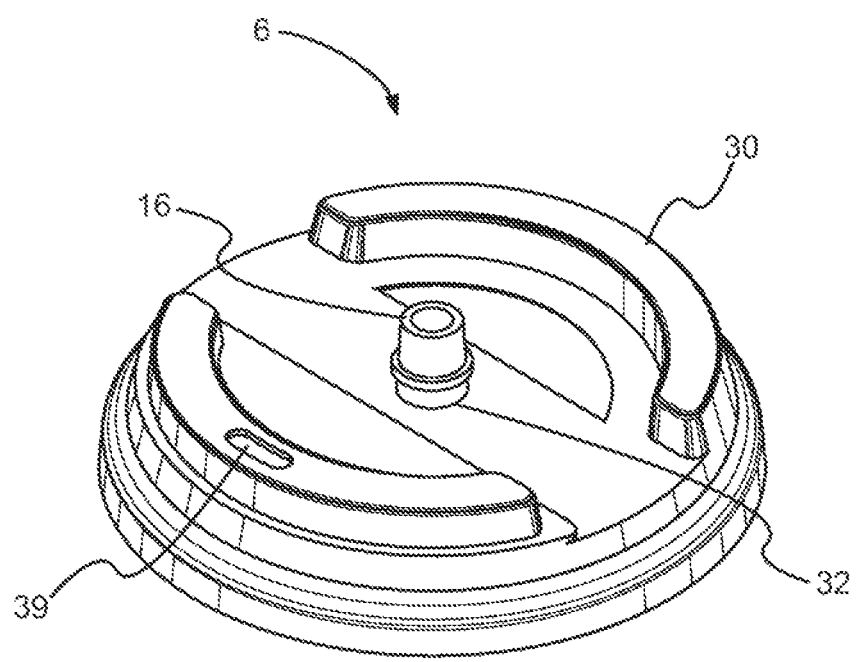
FIG. 14 is an exploded view of a Cup, Lid and Press system according to an exemplary embodiment of the present invention.

FIG. 14 is a cut-out view of the Lid and Press System 6 according to an exemplary embodiment of the present invention. The Push Rod Guide and Stop 16 and Lid Alignment Flange 17 inserts into the Press Ring Guide Hole 32, located substantially at the center of the body of the Lid 30. In the exemplary embodiment described in FIG. 13, the Press Ring Guide Hole 32 includes slits extending into the Lid 30. As explained, these slits may optionally be included to allow the Bottom Flange 44 of the Push Rod 4 (FIGS. 10 and 11) to easily pass through the Press Ring Guide Hole 32.

Figure 15:
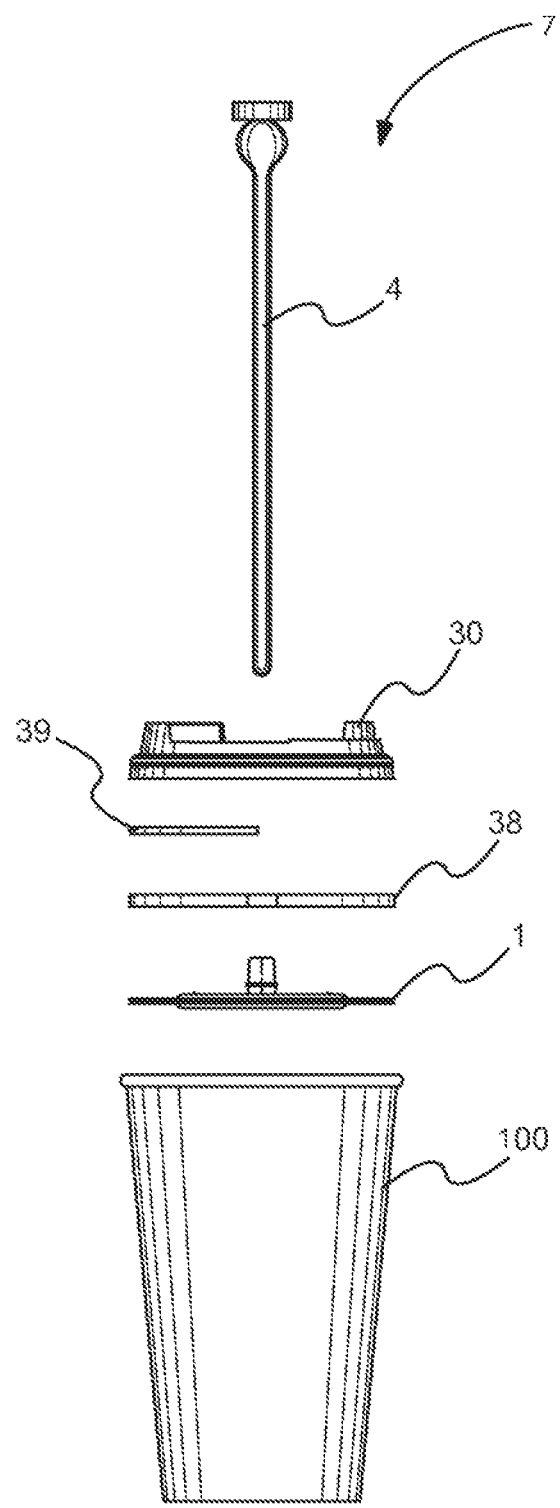
FIG. 15 is a cut-out view of a Cup, Lid and Press system according to an exemplary embodiment of the present invention.

FIG. 15 is an exploded view of a Cup, Lid and Press System 7 according to an exemplary embodiment of the present invention. The Cup 100 is a typical beverage container, like those sold by a coffee retailer. The Cup 100 may come in any size, as long as the lip/rim of the Cup 100 can engages the Lid 30.

As described above, the Filter 39 is held in place by the Filter Retainer 38. The Push Rod Guide 16 and Lid Alignment Flange 17, insert into the Press Ring Guide Hole 32, and the Push Rod Guide 16, Lid Alignment Flange 17, and Press Ring Guide Hole 32 couple/snap together using pressure created by the Press Ring Alignment Flange 17 (FIG. 1 and FIG. 14).

The Push Rod Bottom 41 inserts into the Push Rod Guide and Stop 16 (FIG. 10 and FIG. 1). When pressure is applied to the Push Rod Top Flange 42 (FIG. 10), after insertion into the Press Ring Press Guide Hole 32, the Press Ring 1 is forced out of the Lid 30. The Push Rod 4 forces the Press Ring 1 toward the distal end of the Cup 100.

Figure 16:
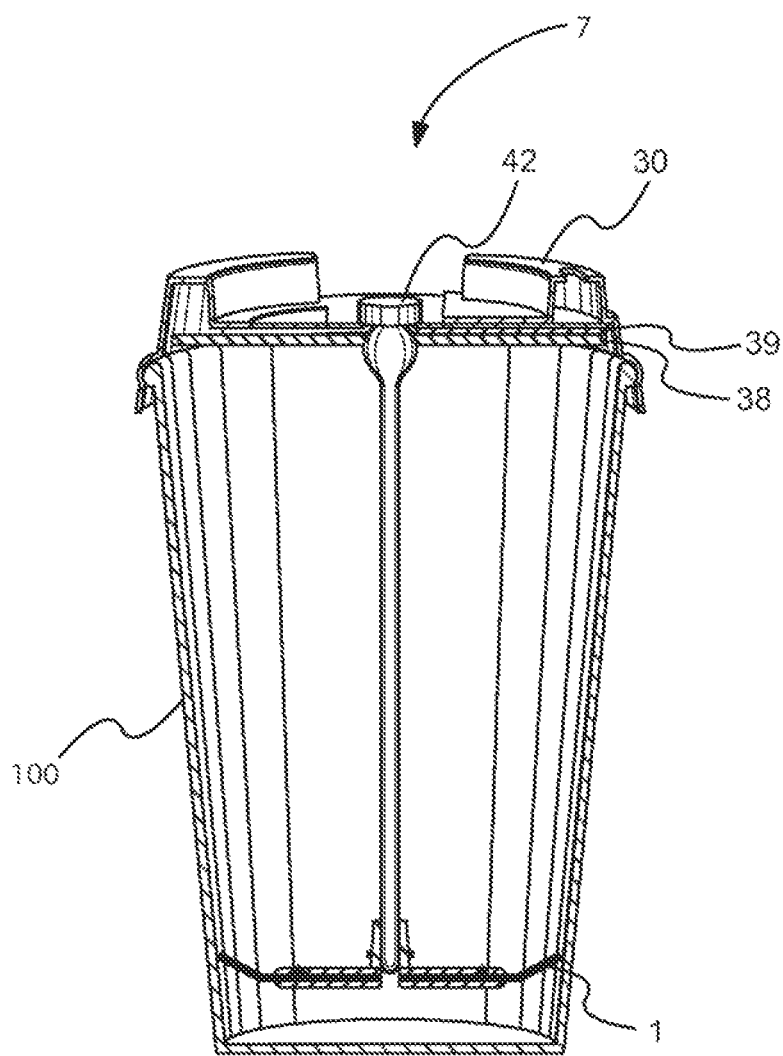
FIG. 16 is a cut-out view of a Lid and Rod system according to an exemplary embodiment of the present invention.

FIG. 16 is a cut-out view of the Cup, Lid and Press System 7 after the Press Ring 1 separates from the Lid 30 due to the applied force that disengages the Alignment Flange 17 from the Push Rod Guide Hole 32.

In this exemplary embodiment, the body of the Cup 100 tapers from top to the bottom, that is, the circumference of the Cup 100 shrinks from the top to the bottom. Thus, as the Press Ring 1 travels down the axis of the Cup 100, a force $F_C$ is applied at the Flaps 12 in the opposite direction that the Press Ring 1 is traveling. The force $F_C$ causes the Attachment Elements 13 to bend uniformly while the Flaps 12 still maintain contact with the inner wall of the Cup 100.

Continued pressure on the Push Rod Top 42 continues to force the Press Ring 1 downwardly along the axis of the Cup 100 until the Adhesion Spikes 19 (if included, see FIG. 2a) contact the bottom of the Cup 100. The Adhesion Spikes 19 maintain contact with the bottom of the Cup 100.

Figure 17:
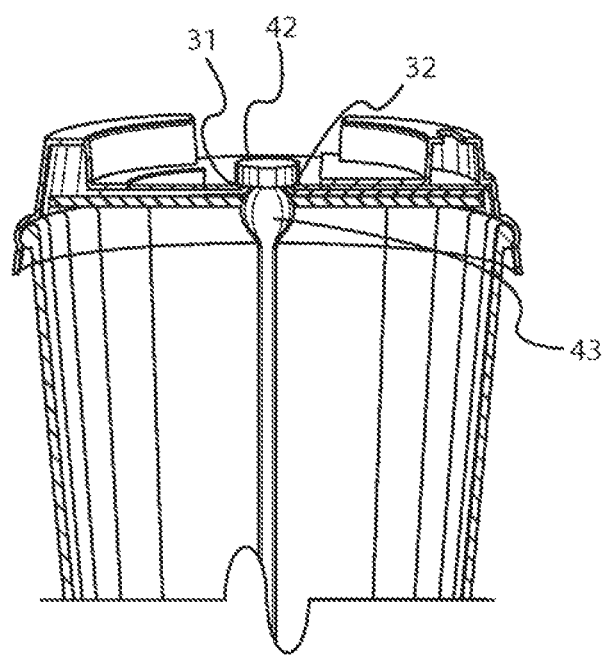
FIG. 17 is a flow chart illustrating an operation of an exemplary embodiment of the present invention.

FIG. 17 is a cut-out view of the Lid 30 and the Push Rod 4. The Lock Flange 43 (FIG. 10) of the Push Rod 4 catches under the Press Ring Guide Hole 32 and the Guide Hole Seal 31. The Seal 31 is depressed by the force of the Top Flange 42 (FIG. 10). The depressed Seal 31 flexes downwardly and creates a seal over the Press Ring Guide Hole 32 with the Lock Flange 43 (FIG. 10).

Next, the use of the Lid, Ring and Cup system 7 (i.e., the beverage press) will be described according to an exemplary embodiment of the present invention.

Figure 18A:
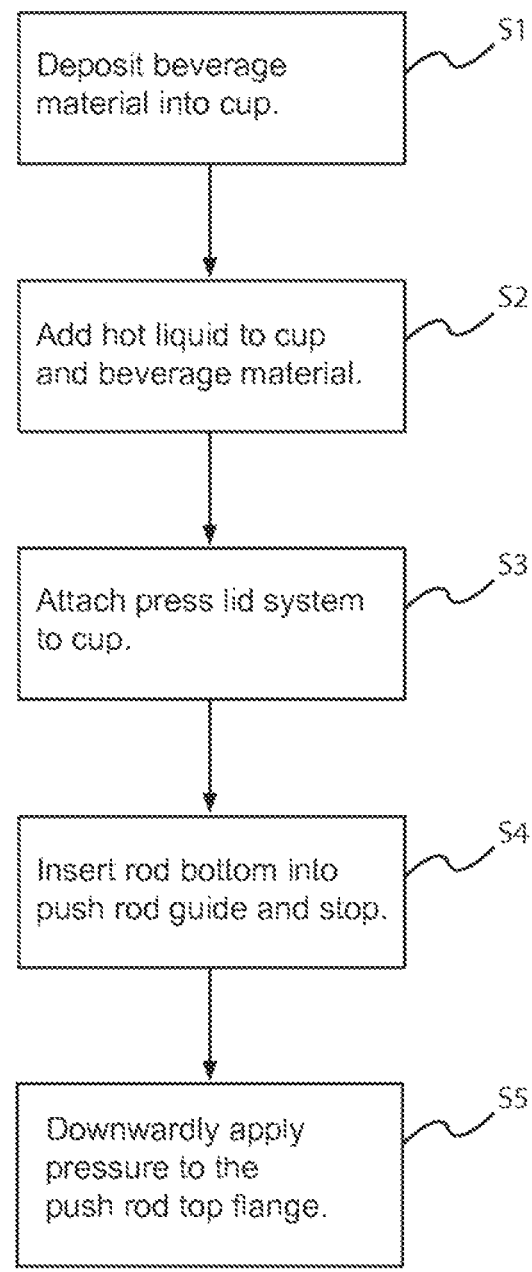
FIGS. 18a-18c are flow charts illustrating a method in accordance with exemplary embodiments of the present invention.
Figure 18B:
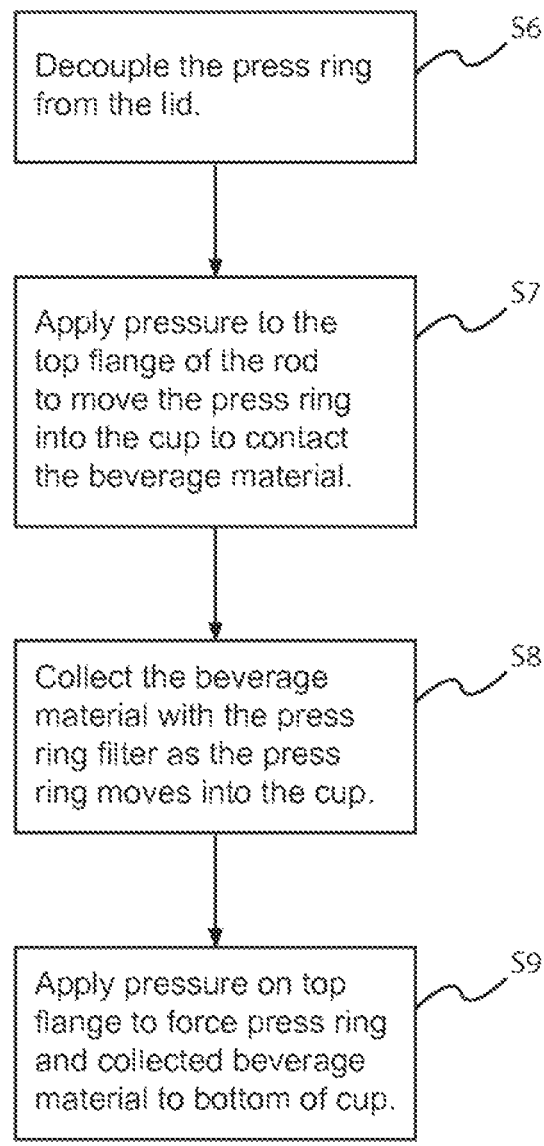
Figure 18C:
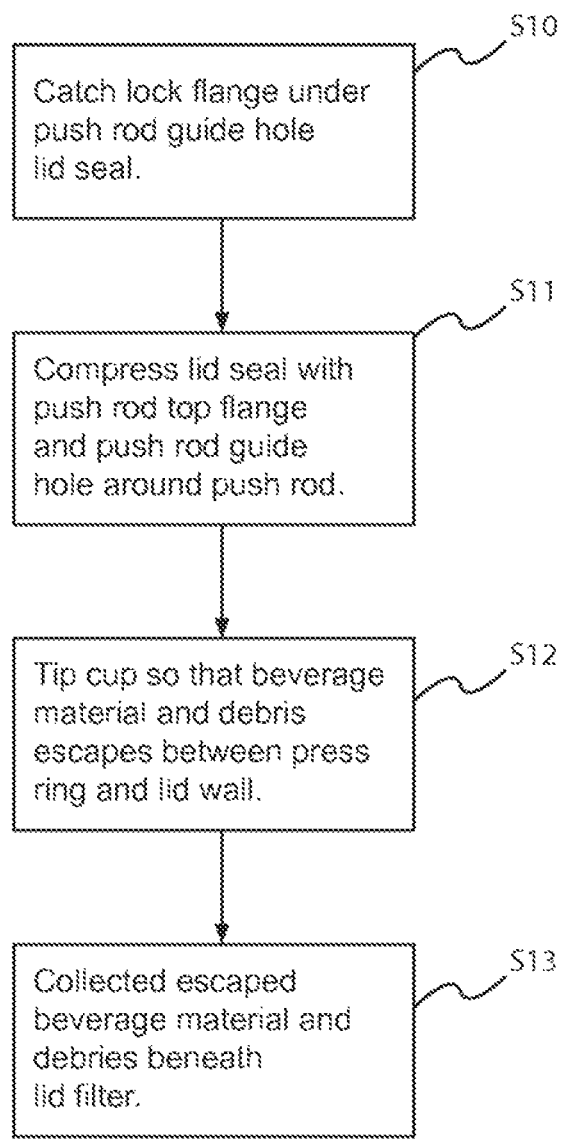

FIG. 18a-18c illustrate the steps to produce an infused beverage using a beverage press with references to FIGS. 7-16, according to an exemplary embodiment of the present invention. A beverage material, e.g., ground coffee, tea, etc., may be deposited into the beverage container (Step S1). Next, a liquid, hot or cold, is added to the Cup 100 (Step S2). A Lid and Press System 6 is fitted over the opening of the Cup 100 such that the Pressure Ring 33 of the Lid 30 engages the rim/lip of the Cup 100 (Step S3). Next, the Push Rod Bottom 41 is inserted into the Push Rod Guide and Stop 16 (Step S4). Once the Push Rod Bottom 41 is inserted into the Push Rod Guide and Stop 16, pressures is applied to the Top Flange 42 of the Push Rod 4 (FIG. 10), the downward pressure decouples the Alignment Flange 17 from the Press Ring Guide Hole 32 (Step S5). Pressure on the Top Flange 42 of the Push Rod 4 (FIG. 10) separates the Press Ring 1 from the Lid System 3, and into the Cup 100 (Step S6). Pressure on the Push Rod Top Flange 42 moves the Press Ring 1 along the axis of the Cup 100 toward the distal end, and eventually the Press Ring 1 contacts the mix of beverage material (e.g., coffee grounds) and liquid (Step S7). As pressure continues to force the Press Ring 1 toward the distal end of the Cup 100, the infused liquid passes through the Filter 11, but the beverage grounds (and any other debris) is collected beneath the Filter 11, and is pushed along the axis of the Cup 100 by the Filter 11 (Step S8).

In this exemplary embodiment, the Cup 100 tapers (i.e., the circumference of the Cup 100 decreases from the top to the bottom), and is made of a flexible material, such as paper or Styrofoam®. Flaps 12 and Filter 11 maintain contact with the inner wall of the Cup 100 as the Press Ring 1 moves downward. This contact insures that most of the beverage material and debris remains under the Filter 11. Continued pressure on the Push Rod Top Flange 42 forces the Press Ring 1, the beverage material, and any debris to the bottom of the cup (Step S9). Lock Flange 43 (FIG. 10) catches under the Press Ring Guide Hole 32 (Step S10). The Seal 31 compresses down around the Press Ring Guide Hole 32 by the Push Rod Top Flange 42 to seal the Push Rod Guide Hole 32 around the Push Rod 4 (Step S11). This stops the liquid from passing through the Press Ring Guide Hole 32, and holds the Push Rod 4 firmly pressed against the Push Rod Guide and Stop 16, which in turn holds the Press Ring 1 near the bottom of the Cup 100.

If there are Adhesion Spikes 19 beneath the Press Ring 1, the Adhesion Spikes 19 will remain firmly pressed against the bottom of the Cup 100.

At this point, condiments may be added to the coffee cup via the Condiment Hole 35, by first pressing on the Condiment Hole Cover until a perforated portion separates from the lid, and then adding the condiments via the condiment hole Cover (Step not shown). However, this step is not required.

Next, as the Cup 100 is tipped, some beverage material and debris "escapes" from beneath the Filter 11, between the Inner Wall of the Cup 100, the Flaps 12 and Filter 11 (Step S12). As explained above, this is because the beverage cup is made of a material that does not readily maintain its shape, and when the liquid is of a sufficient temperature (the temperature of a cup of coffee), the material is even more malleable. Thus, when the cup is tipped, or even when the Flaps 12 and Filter 11 apply force to the inner wall of the Cup 100, the cross section of the Cup 100 is deformed from a substantially circular shape to, for example, an oval shape, and beverage material and debris escape upward past the Flaps 12 and Filter 11.

As the Cup 100 is tipped, infused liquid passes through Lid Filter 39 (Step S13) Any beverage material or debris that escaped passed the Flaps 12 and Filter 11 is trapped beneath Lid Filter 39, so that only liquid pass through the Pour Spout 36.

Figure 19:
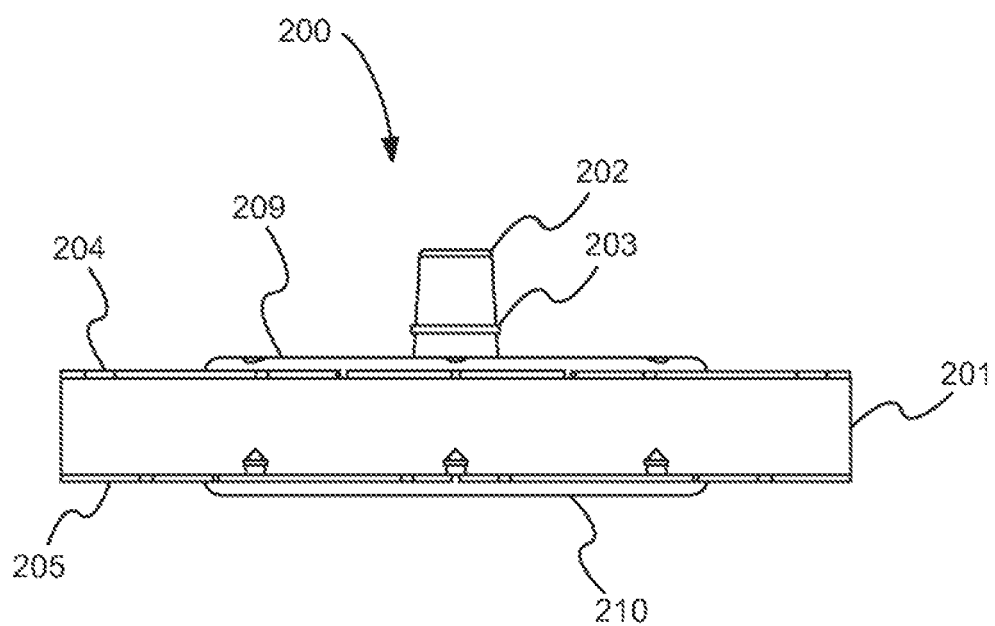
FIG. 19 is a side view of a Press Ring according to an exemplary embodiment of the present invention.
Figure 20:
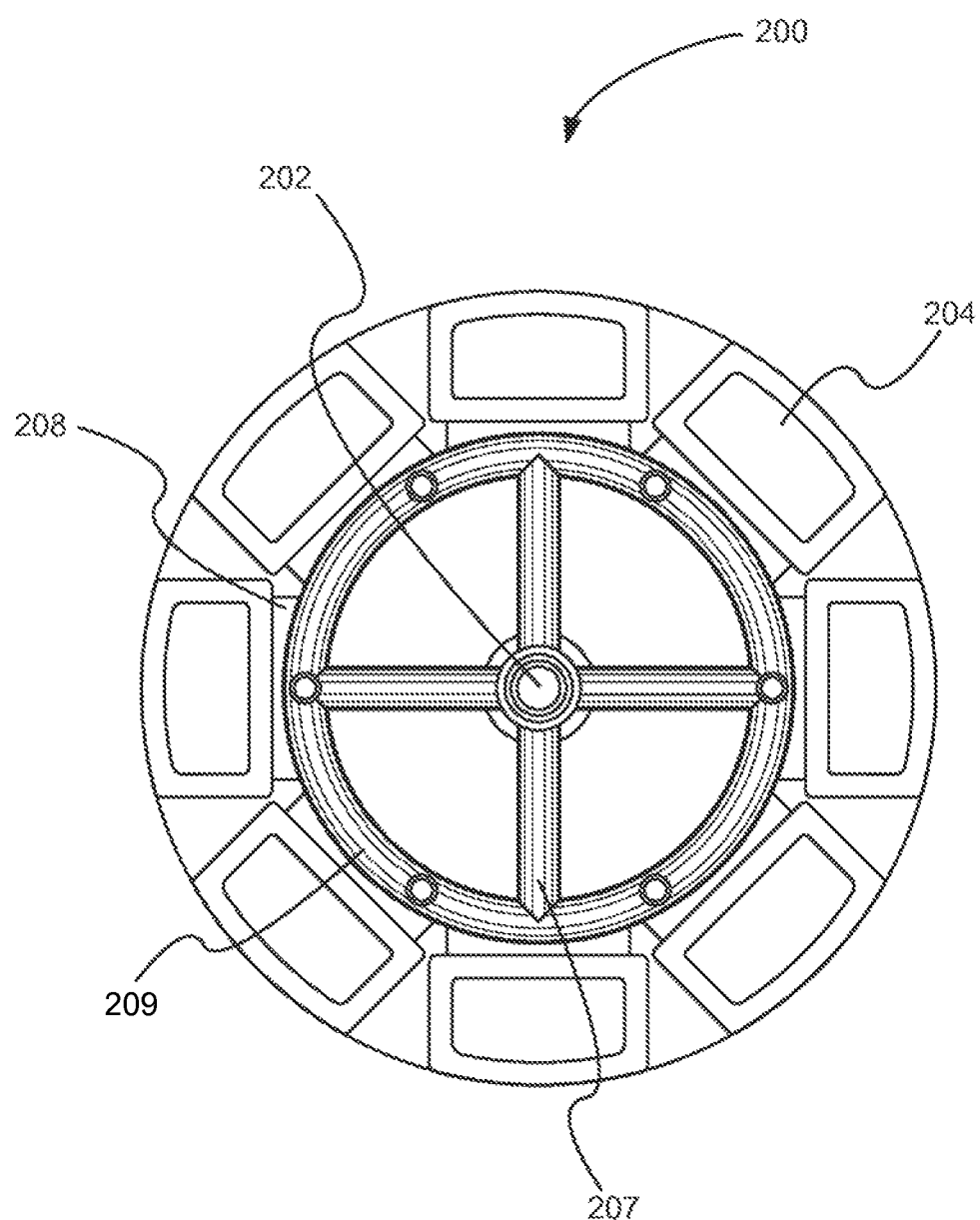
FIG. 20 is a view of a Press Ring according to an exemplary embodiment of the present invention.
Figure 21:
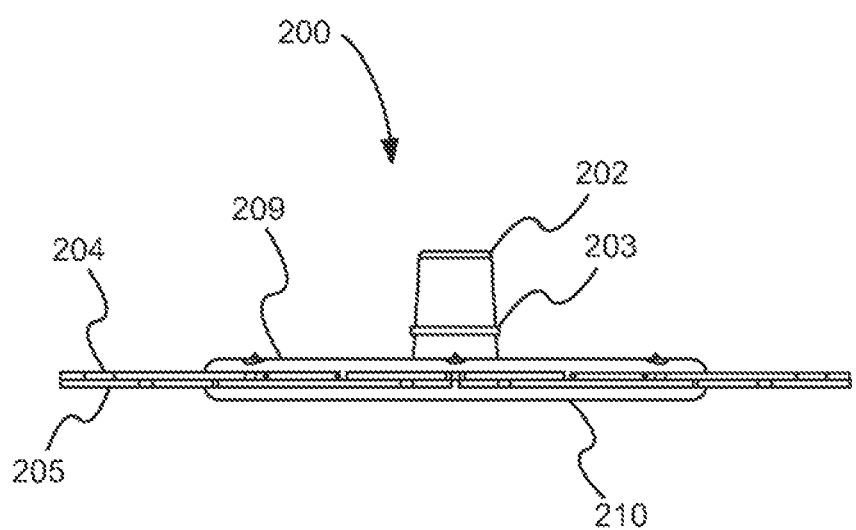
FIG. 21 is a top-down view of a Press Ring according to an exemplary embodiment of the present invention.

FIGS. 19-21 illustrate a Press Ring 200 according to another exemplary embodiment of the present invention. FIG. 19 is a side view of the Press Ring 200. The Press Ring 200 includes a Filter 201, a Guide and Stop 202, an Alignment Flange 203, Upper Flaps 204, and Lower Flaps 205. According to this exemplary embodiment, the Filter 201 is disposed between the Upper Flaps 204 and the Lower Flaps 205. Both the Upper Flaps 204 and Lower Flaps 205 are attached to an Upper Frame 209 and a Lower Frame 210, and pivot around Flap Attachment Elements 208, that couple the Upper Flaps 204 and Lower Flaps 205, to the Upper Frame 209 and the Lower Frame 210.

The Upper Flaps 204 are connected to the perimeter of an Upper Frame 209, and the Lower Flaps are connected to the perimeter of a Lower Frame 210.

FIG. 20 is a top-down view of the Press Ring 200, that makes it possible to see that the Press Ring 200 further includes Struts 207, an Upper Frame 209, and Attachment Elements 208. The Guide and Stop 202 is disposed at the center of the area defined by the Upper Frame 209. The Struts 207 extend from the Upper Frame 209 to the Guide and Stop 202. One of ordinary skill in the art would recognize that the number of Struts 207 could change.

The Guide and Stop 202, as with the Guide and Stop 16 (FIG. 1), couples to the Lid 20 (e.g., FIG. 3) by inserting into the Guide Hole 22 (FIG. 4). The Press Ring 200 and a Lid 20 (FIG. 3) "snap" together, by apply pressure to the Press Ring 200 until the Alignment Flange 203 passes through the Press Ring Guide Hole 22 (FIG. 4). The Press Ring 200 stays coupled to the Lid 30 (FIG. 4) by the pressure of the Press Ring Guide Hole 22 on the Alignment Flange 203.

The Upper Flaps 204 and Lower Flaps 205 may be at a position so the that the plane of the flaps are on substantially the same plane as the area defined by the Upper Frame 209 and Lower Frame 210. As with the Press Ring 1 (FIG. 1), when the Press Ring 204 moves from the Lid 30 (FIG. 4) to the distal end of a beverage container, if the beverage container tapers toward the distal end, the inner walls of the beverage container exert a force that causes the Upper Flaps 204 and Lower Flaps 205 to pivot in the opposite direction as the Press Ring 204 is moving.

In another exemplary embodiment, the Upper Flaps 204 and Lower Flaps 205 may be bent downward (toward the distal end of the beverage container) at a 45 degree angle. By bending the Upper Flaps 204 and Lower Flaps 205 before pressing the Press Ring 200, when the inner wall of the beverage container exerts a force on the Upper Flaps 204 and Lower Flaps 205, the flaps will bend toward the distal end of the beverage container, in the same direction that the Press Ring 200 is moving. As the Upper Flaps 204 and lower Flaps 205 bend toward the distal end of the beverage container, the flaps may form a basket-like enclosure around the beverage material and any other debris collected under the Filter 201.

According to one exemplary embodiment, the Upper Flaps 204 and Lower Flaps 205, pivot around the Attachment Elements 208, which operate like a mechanical hinge. The Attachment Elements 208 may rotate around a pin, or it may be made of a material that is sufficiently flexible, such as plastic, paper, etc. Additional mechanical hinges may be added so that that the flaps bend at more than one point. For example, additional hinges could be added at the point where the Upper Flaps 204 and Lower Flaps 205 contact the Attachment Element 208, and hinges could be added at the point where the Attachment Elements 208 contact the Upper Frame 209 and Lower Frame 208. By adding additional hinges, the Press Ring 200 may assume a more basket like enclosure around the beverage material and debris.

FIG. 21 is a side view of the Press Ring 200 in the closed position. The Upper Frame 209 and the Lower Frame 210, close, holding between them the Filter 201. The Upper Frame 209 and Lower Frame 210 could be closed during manufacturing, for example by a welding, or later, by "snapping" together the two pieces using methods known to those having ordinary skill in the art.

Figure 22:
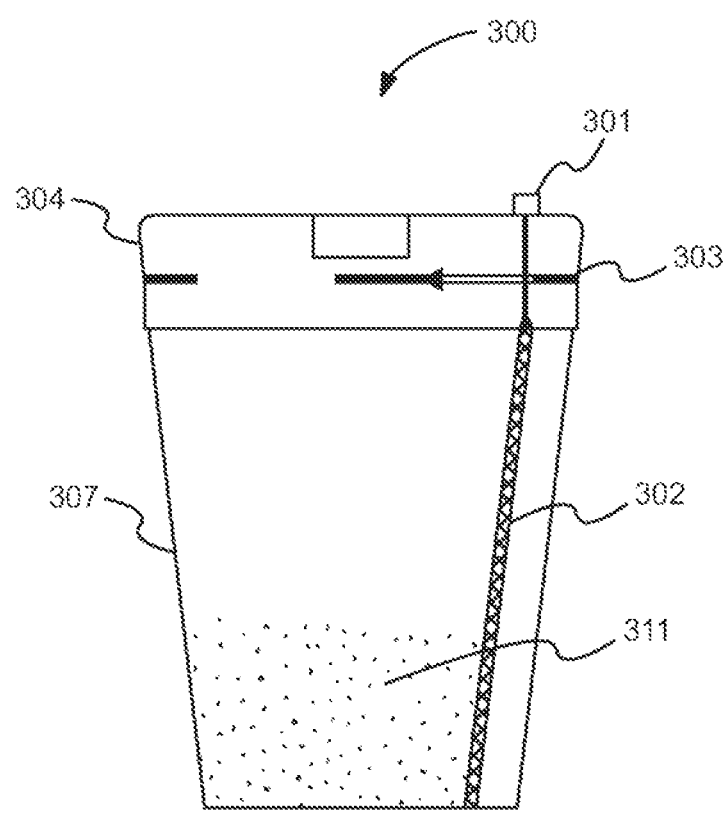
FIG. 22 is a side view of a Lid, Cup, Press system according to exemplary embodiment of the present invention.

FIG. 22 is a cut-out view of a Lid, Cup, Press 300 according to an exemplary embodiment of the present invention. The Lid, Cup, System 300, instead of a press ring, uses a vertical filtration system, operated by a Side Lever 301. The Slide Filter 302 is attached to the Slide Lever 401, and extends downward to the bottom of the Cup 307. The Slide Lever 301 is disposed on Lid 304. By sliding the Slide Lever 301 across the Lid 304, the Slide Filter 302 moves horizontally, collecting Beverage Material 311.

Figure 23:
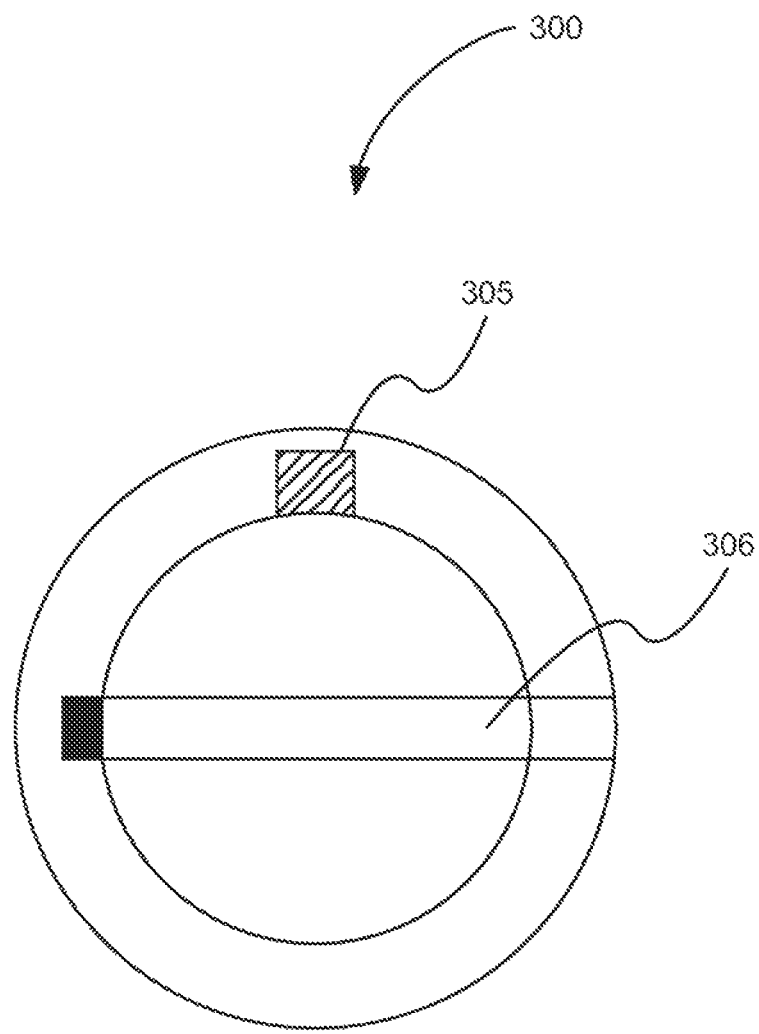
FIG. 23 is a top-down view of a Lid, Cup, Press system according to an exemplary embodiment of the present invention.

FIG. 23 is a top-down view of the Lid, Cup, Press System 300. A Slide Lever Slot 306 is located on the top of the Lid 304. The Slide Lever Slot 306 extends across the diameter of the Lid 304. The Slide Lever Slot 306 opening extends into the Lid 304, so that the Slide Lever 301 may be attached to the Slide Filter 302. As the Slide Lever 301 is moved along the Slide Lever Slot 36, the attached Slide Filter 302 is pulled in the same direction, filtering the Beverage Material 311. When the Lid, Cup, Press System 300 is tipped to pour out liquid, any Beverage Material 311 or other debris that is not collected by the Slide Filter 302 is collected by the Lid Filter 303, located beneath the Pour Spout 305.

Figure 24:
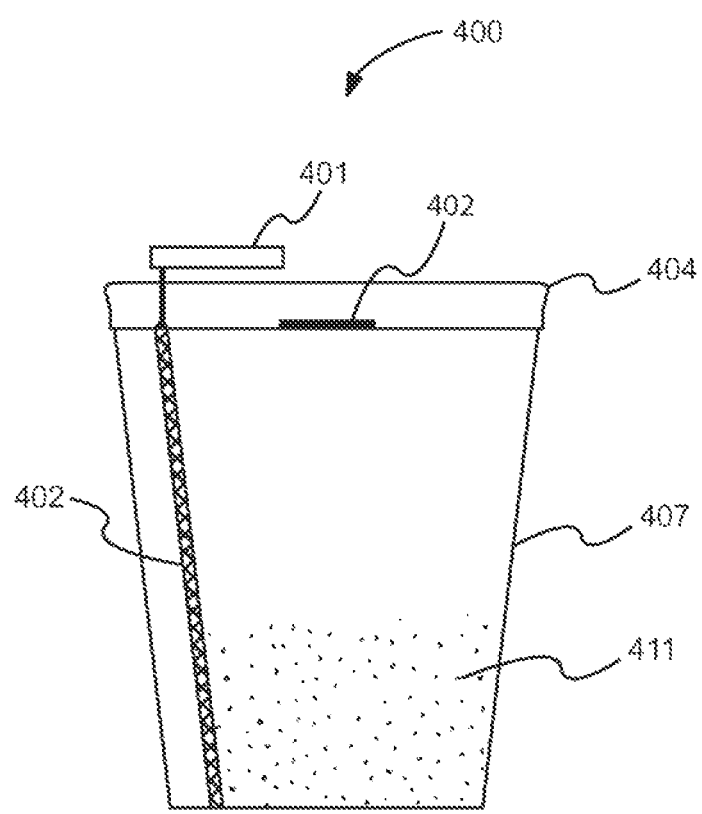
FIG. 24 is a side-view of a Lid, Cup, Press system according to an exemplary embodiment of the present invention.

FIG. 24 is a cut-out view of a Lid, Cup, Press System 400 according to an exemplary embodiment of the present invention. The Lid, Cup, System 400, instead of a press ring, uses a vertical filtration system, operated by a Dial 401. The Slide Filter 402 is attached to the Dial 401, and extends downward to the bottom of the Cup 407. The Dial 401 is disposed on Lid 404. By turning the dial 401, the Slide Filter 402 moves horizontally, collecting Beverage Material 411.

Figure 25:
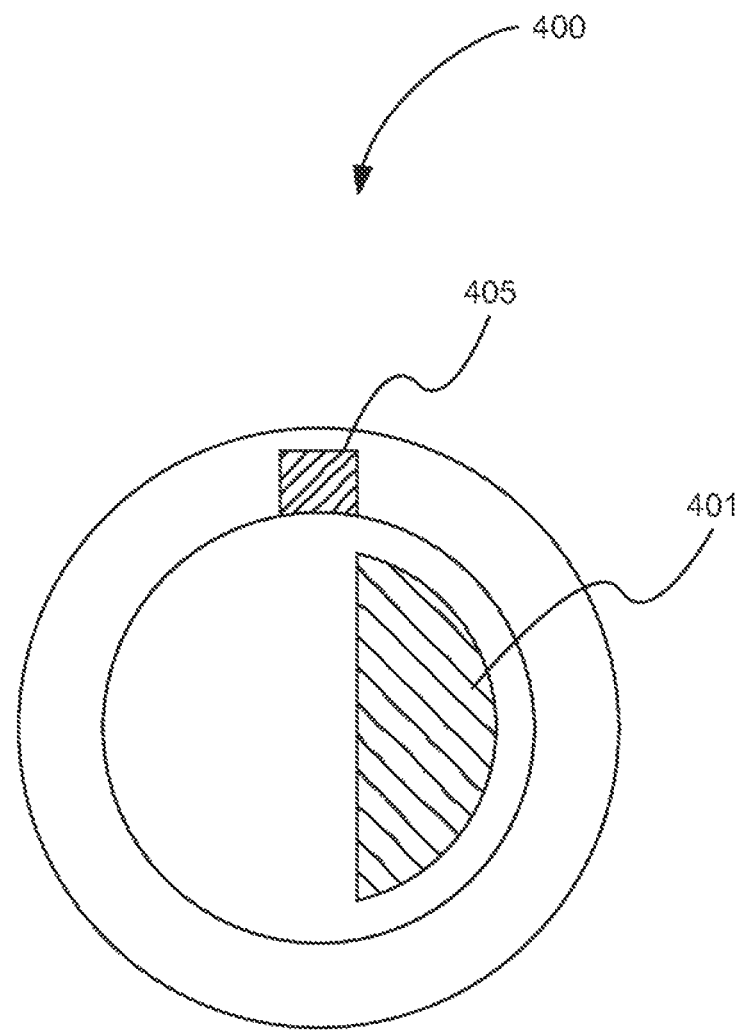
FIG. 25 is a top-down view of a Lid, Cup, and Press system according to an exemplary embodiment of the present invention.

FIG. 25 is a top-down view of the Lid, Cup, Press System 400. The Dial 401 is disposed at the top of the Lid 404. As the Dial 401 is turned, the attached Slide Filter 402 is pulled across the Cup 407, filtering the Beverage Material 411. When the Lid, Cup, Press System 400 is tipped to pour out liquid, any Beverage Material 411 or other debris that is not collected by the Slide Filter 402 is collected by the Lid Filter 403, located beneath the Pour Spout 405.

Figure 26:
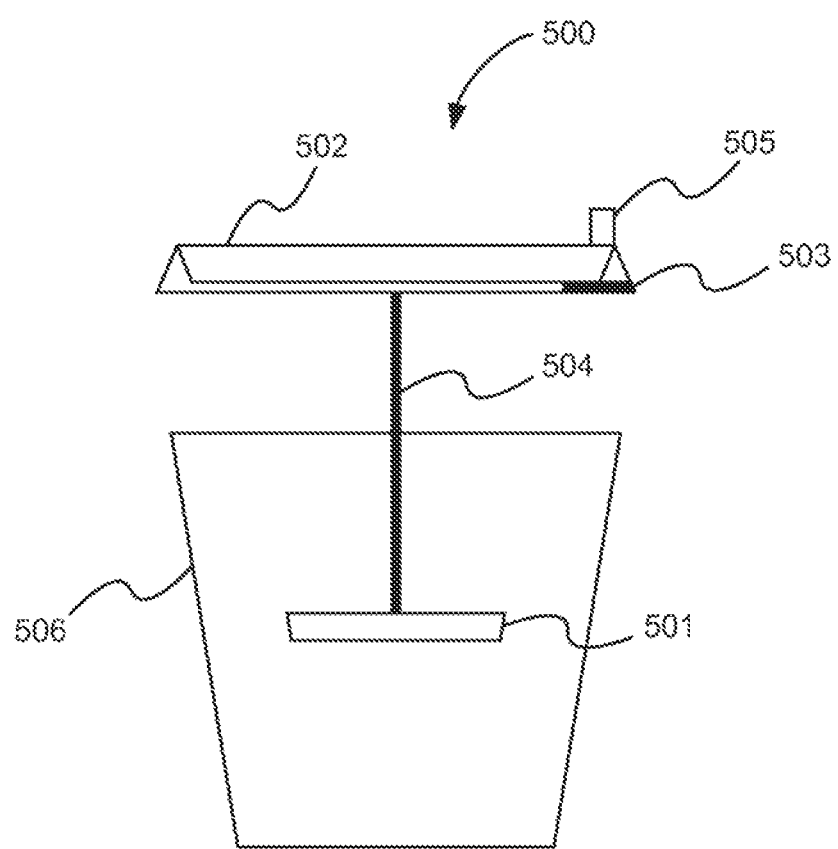
FIG. 26 is a side view of a Lid, Cup, and Press system according to an exemplary embodiment of the present invention.

FIG. 26 is a cut-out view of a Lid, Cup and Static Press System 500, according to an exemplary embodiment of the present invention. The Lid, Cup, and Static Press System 500 includes a Press Ring with Filter 501, A Lid 502, a Lid Filter 503, a Static Rod 504, a Pour Spout 505, and a Cup 506. The Static Rod 504, Press Ring with Filter 501 and Lid 502 are a single unit. The Static Rod 504 is attached to the underside of the Lid 502 on one end, and the Press Ring with Filter 501 on the other end. By making the Lid 502, Static Rod 504 and Press Ring with Filter 501 a single unit, there is no need for a Guide and Stop 16 (FIG. 1) or a Guide Hole 22 (FIG. 2), as in other embodiments. This obviates the need for a Press Rod 4, which has a Top Flange 42 and Bottom Flange 44 (FIG. 10). To use the Lid, Cup and Static Press System 500, beverage material is placed in the Cup 506, a liquid is added, and then the single unit of the Lid 502, Static Rod 504, and Press Ring with Filter 501, is attached to the Cup 506. As the Lid 502 is placed on the Cup 506, the Press Ring with Filter 501 presses beverage material and any debris to the bottom of the cup by collecting the beverage material and debris beneath the filter in the Press Ring with Filter 501. When the cup is tipped to pour out water via the Pour Spout 505, any beverage material or debris that escapes the Press Ring with Filter 501, is collected by the Lid Filter 503.

One of ordinary skill in the art that the present invention could take many different embodiments, and the described embodiments are not intended to limit the invention thereto. For example, instead of a push rod, in another exemplary embodiment, a string is located at the bottom of the beverage container that passes through the bottom (i.e., closed) end of the cup and attaches to a press ring. When pulled, the string applies a force to the press ring, pulling it toward the distal end of the beverage container.

In another exemplary embodiment, the beverage grounds are placed at the bottom of a cup during a manufacturing process. A press ring, similar to the Press Ring 1 (FIG. 1), or Press Ring 200 (FIG. 19), holds the beverage material against the bottom of the cup. After adding a hot liquid, a Lid, such as Lid 20 (FIG. 4), is placed over the cup. The hot liquid is infused through the filter in the Press Ring. In another exemplary embodiment, a tight seal is maintained between the press ring and the wall of the cup, and a typical disposable beverage container lid is used instead of a Lid 20.

In another exemplary embodiment, there is no press ring, merely a filter made of, for example plastic.

One of ordinary skill in the art would realize that there are many advantages achieved by the components and systems described above. For example, the Lid and Press system described above can be utilized in most commercially available dome lids. The Lid and Press system is stackable just like the dome lids available at many retailers. Further, the Lid and Press System will fit on the typical cup found at many retailers. Further, the Press Lid and Press system described above requires virtually no assembly, other than snapping the Lid and Press system on a cup and inserting the Rod.

What is claimed:

1. A beverage container comprising a press ring system, the press ring system comprising:
   an upper support member;
   a lower support member;
   a plurality of flaps coupled to the upper support member and the lower support member by attachment elements; and
   a filter disposed between the upper and lower support members;
   wherein the press ring system is disposed below a dome lid connected to the beverage container, the dome lid including a body having a substantially circular planer top surface, a filter slot on the body, a guide hole through the substantially circular planar top surface; and a sealing portion around the guide hole.

2. The beverage container according to claim 1, wherein the dome lid further comprises:
   a side surface depending downwardly from said top surface; and
   a downwardly facing cup rim engaging recess formed near the outer periphery of a side surface.

3. The beverage container according to claim 1, wherein the dome lid further comprises a pour spout disposed above the filter slot.

4. The beverage container according to claim 1, wherein the dome lid further comprises a condiment hole.

5. The beverage container according to claim 1, wherein the dome lid further comprises a filter slot and a pour spout disposed above the filter slot.

6. The beverage container according to claim 1, wherein the dome lid further comprises a filter retainer.

7. The beverage container according to claim 6, wherein the filter retainer comprises a retainer body with a removed portion.

8. The beverage container according to claim 7, wherein the filter retainer comprises at least one hole through the retainer body that is separate from the removed portion.

9. The beverage container according to claim 7, wherein a side portion extends transverse from the retainer body along the perimeter of the retainer body.

10. The beverage container according to claim 9, wherein the filter retainer is disposed in the dome lid such that the side portion of the filter retainer abuts an inner wall of the dome lid.

* * * * *